(12) United States Patent
Fischer et al.

(10) Patent No.: US 8,582,485 B2
(45) Date of Patent: Nov. 12, 2013

(54) SCHEDULED CLEAR TO SEND (CTS) FOR MULTIPLE USER, MULTIPLE ACCESS, AND/OR MIMO WIRELESS COMMUNICATIONS

(75) Inventors: Matthew James Fischer, Mountain View, CA (US); Peiman Amini, Mountain View, CA (US); Vinko Erceg, Cardiff by the Sea, CA (US); Joseph Paul Lauer, North Reading, MA (US); Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 602 days.

(21) Appl. No.: 12/817,118

(22) Filed: Jun. 16, 2010

(65) Prior Publication Data

US 2010/0309871 A1 Dec. 9, 2010

Related U.S. Application Data

(63) Continuation-in-part of application No. 12/796,654, filed on Jun. 8, 2010, which is a continuation-in-part of application No. 12/794,711, filed on Jun. 4, 2010, and a continuation-in-part of application No. 12/794,707, filed on Jun. 4, 2010.

(60) Provisional application No. 61/187,326, filed on Jun. 16, 2009, provisional application No. 61/185,153, filed on Jun. 8, 209, provisional application No. 61/185,161, filed on Jun. 8, 2009, provisional application No. 61/186,119, filed on Jun. 11, 2009, provisional application No. 61/311,480, filed on Mar. 8, 2010, provisional application No. 61/250,491, filed on Oct. 9, 2009, provisional application No. 61/255,690, filed on Oct. 28, 2009, provisional application No. 61/257,323, filed on Nov. 2, 2009, provisional application No. 61/321,430, filed on Apr. 6, 2010, provisional application No. 61/184,420, filed on Jun. 5, 2009.

(51) Int. Cl.
*H04W 72/00* (2009.01)

(52) U.S. Cl.
USPC ............................ 370/312; 370/336; 455/450

(58) Field of Classification Search
USPC ......... 370/221, 312, 338, 448, 445, 447, 334, 370/336; 455/434, 450, 453
See application file for complete search history.

(56) References Cited

U.S. PATENT DOCUMENTS

| 7,599,346 B2 * | 10/2009 | Brommer | 370/346 |
|---|---|---|---|
| 7,804,800 B2 * | 9/2010 | Li et al. | 370/334 |
| 2006/0109923 A1 * | 5/2006 | Cai et al. | 375/260 |
| 2007/0223423 A1 * | 9/2007 | Kim et al. | 370/334 |
| 2009/0086842 A1 * | 4/2009 | Shi et al. | 375/267 |

FOREIGN PATENT DOCUMENTS

WO WO 2009027931 A2 * 3/2009 ............ H04W 74/08

* cited by examiner

*Primary Examiner* — Michael Thier
*Assistant Examiner* — Curtis A Alia
(74) *Attorney, Agent, or Firm* — Garlick & Markison; Kevin L. Smith

(57) ABSTRACT

Scheduled clear to send (CTS) for multiple user, multiple access, and/or MIMO wireless communications. Before sending transmissions, a request to send (RTS)/clear to send (CTS) exchange takes place between a transmitting wireless communication device and multiple receiving wireless communication devices may take place therein. The transmitting wireless communication device (e.g., an AP) may generate and transmit a multi-user request to send (mRTS) frame to a number of receiving wireless communication devices (e.g., STAs). The mRTS frame can include information and instructions therein to direct the manner by which all or a subset of the receiving wireless communication devices are to provide CTS responses back to the transmitting wireless communication device. The mRTS frame may be an OFDMA frame, a MU-MIMO frame, or a combination thereof. The CTS responses may be received in accordance with any one or combination of OFDM signaling, OFDMA signaling, and MU-MIMO signaling.

29 Claims, 38 Drawing Sheets

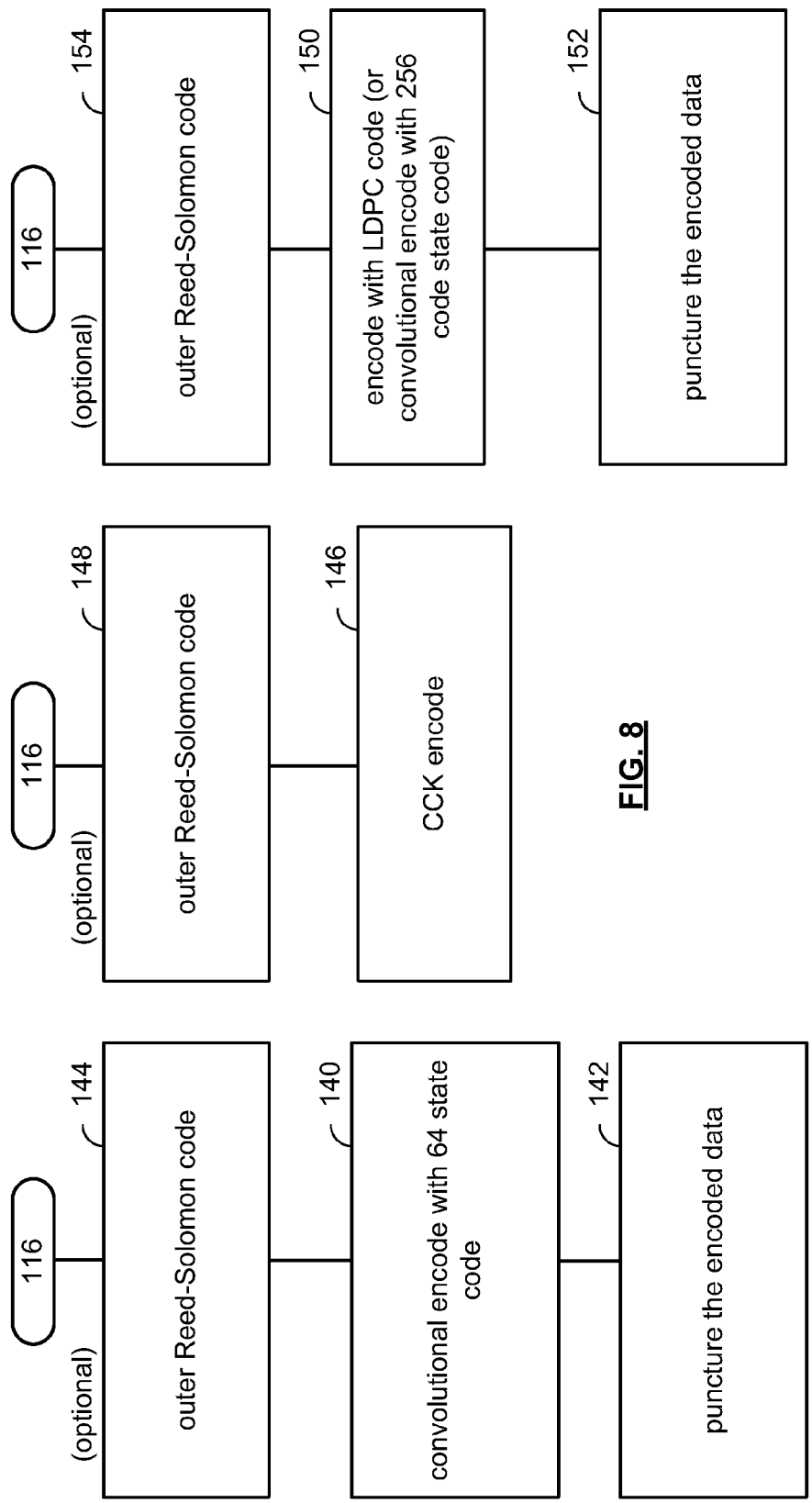

FIG. 18    scheduled RTS using mRTS (3)

FIG. 19  scheduled RTS using mRTS ((3) with BAD CRC)

scheduled RTS using mRTS ((3) with NAV≠0)

scheduled RTS using mRTS (4)

scheduled RTS using mRTS (5)

scheduled RTS using mRTS (6)

Combination of temporal OFDMA and MU-MIMO CTS separations (e.g., mRTS TX has OFDMA and MU-MIMO RX capability)

scheduled RTS using mRTS (8)

FIG. 27  scheduled RTS using mRTS (9)

scheduled RTS using mRTS (10)

mRTS TX has directed a single STA (STA1) to respond with CTS
STA1 has MU-MIMO and OFDMA RX capability FIG. 29  scheduled RTS using mRTS (11)

FIG. 30  scheduled RTS using mRTS (12)

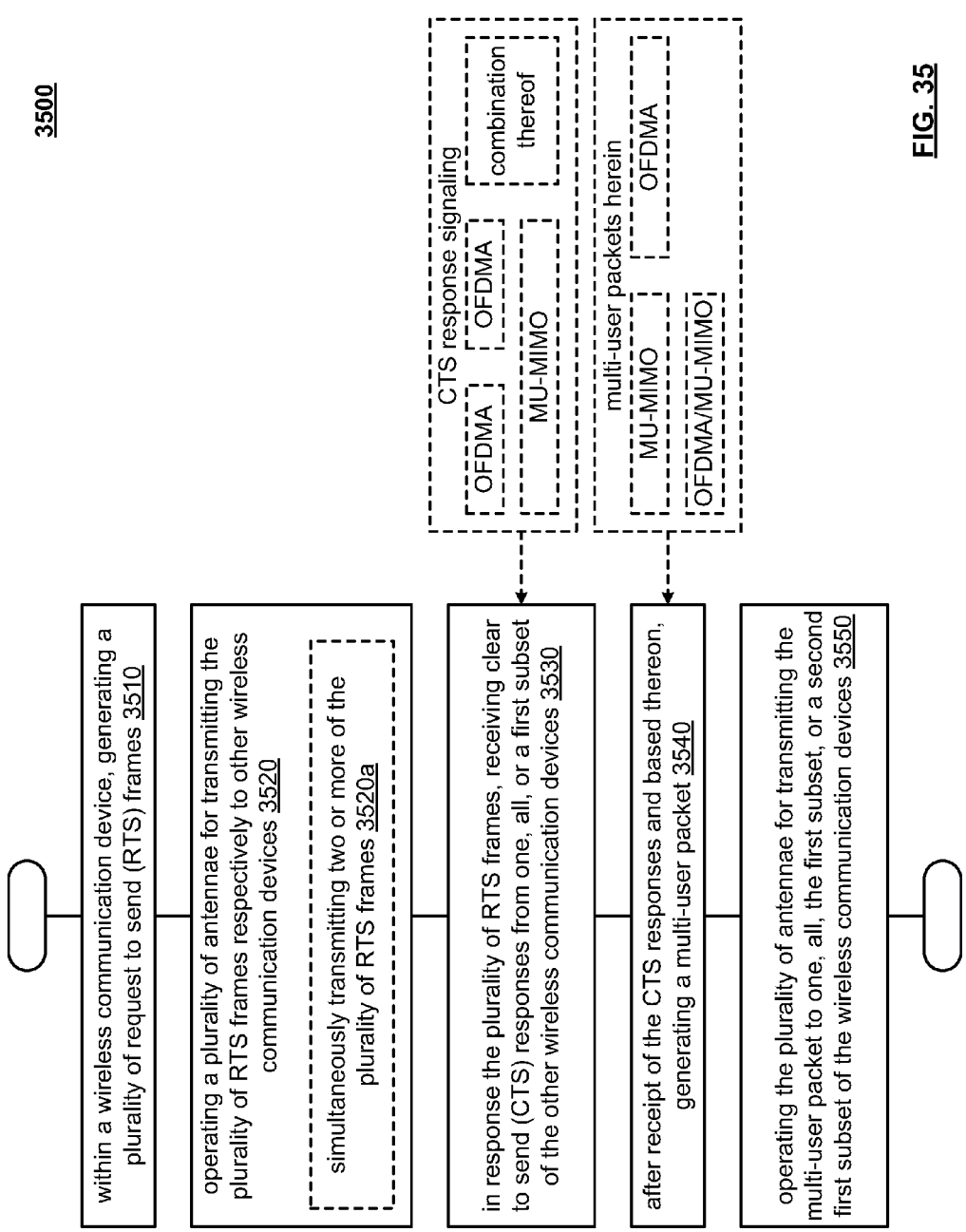

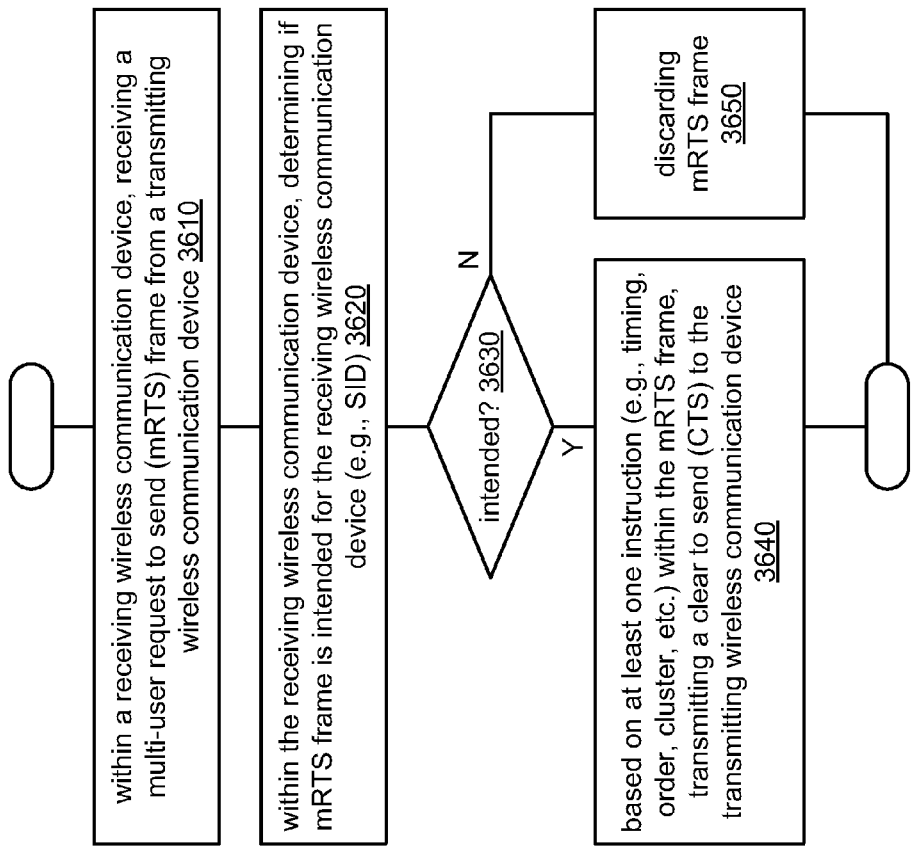

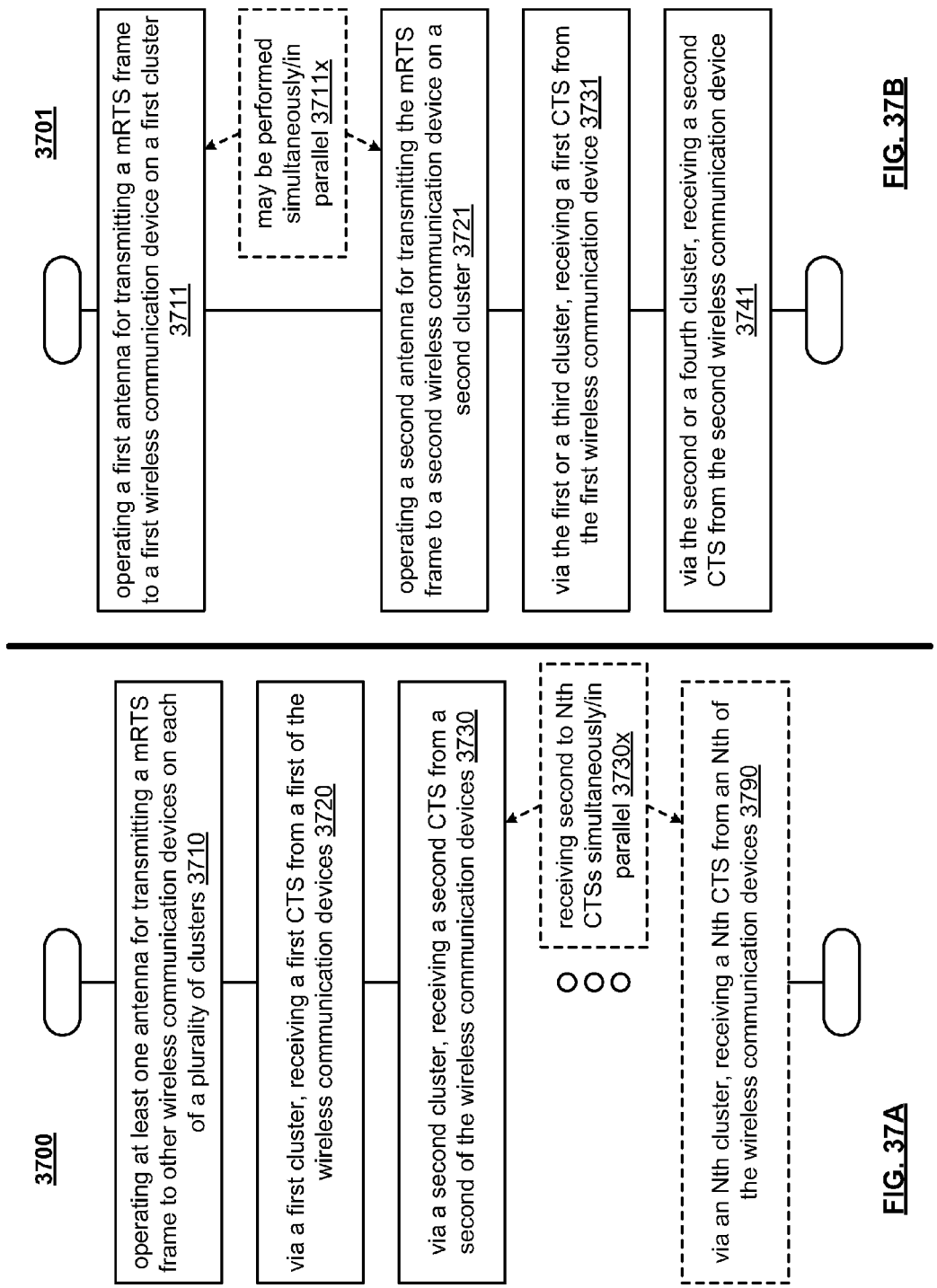

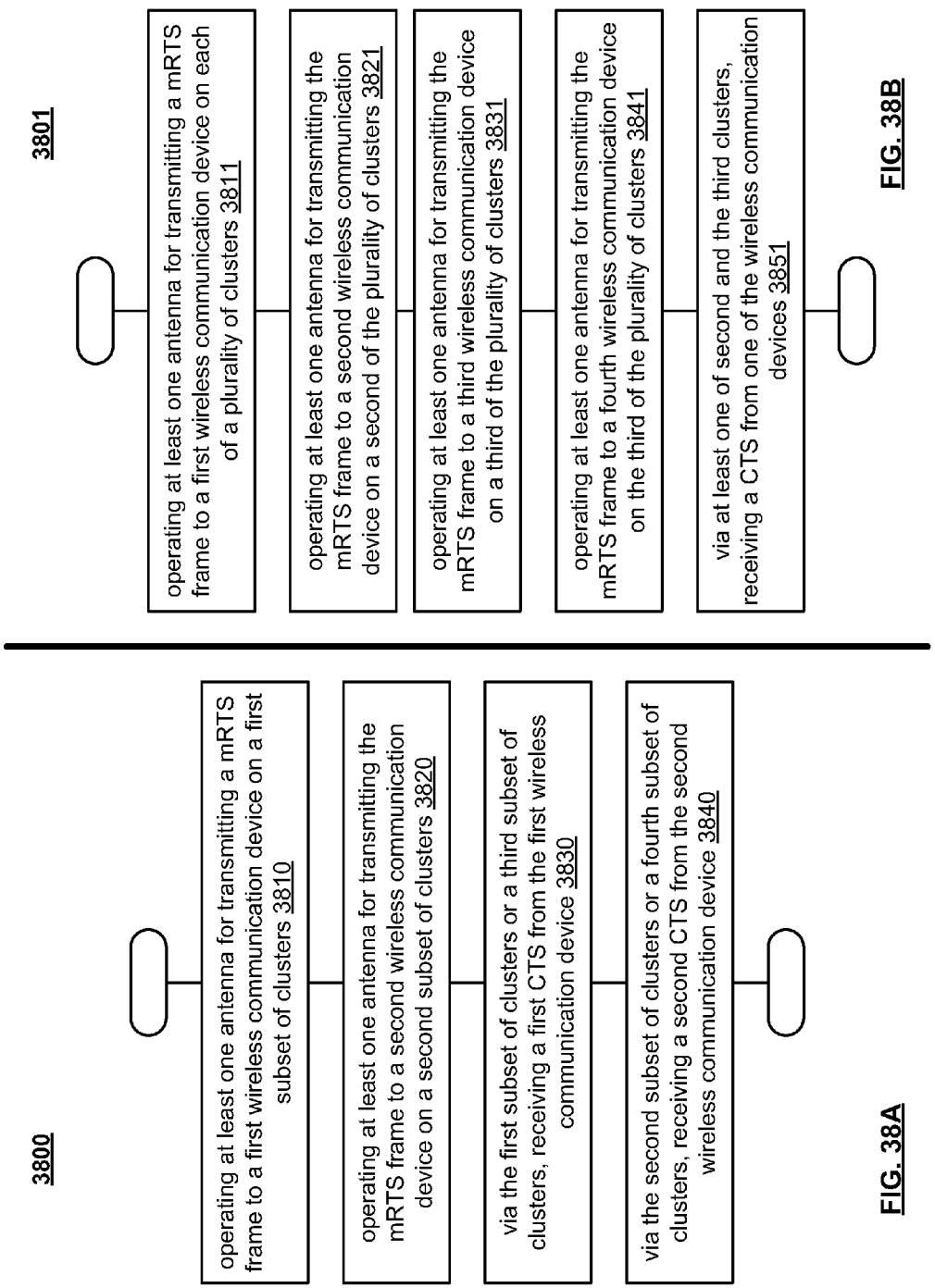

SCHEDULED CLEAR TO SEND (CTS) FOR MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/187,326, entitled "Scheduled clear to send for OFDMA multiple access and/or multi-user MIMO WLAN transmissions," filed Jun. 16, 2009.

Continuation-in-Part (CIP) Priority Claim, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility patent application Ser. No. 12/796,654, entitled "Channel characterization and training within multiple user, multiple access, and/or MIMO wireless communications," filed on Jun. 8, 2010, now U.S. Pat. No. 8,526,351, issued on Sep. 3, 2013, which claims priority pursuant to 35 U.S.C. §119(e) to the following U.S. Provisional Patent Applications which are hereby incorporated herein by reference in their entirety and made part of the present U.S. Utility Patent Application for all purposes:
   1.1. U.S. Provisional Application Ser. No. 61/185,153, entitled "OFDMA cluster parsing and acknowledgement to OFDMA/MU-MIMO transmissions in WLAN device," filed Jun. 8, 2009.
   1.2. U.S. Provisional Application Ser. No. 61/185,161, entitled "WLAN Multi-user/OFDM multiple access training," filed Jun. 8, 2009.
   1.3. U.S. Provisional Application Ser. No. 61/186,119, entitled "WLAN Multi-user/OFDM multiple access training," filed Jun. 11, 2009.
   1.4. U.S. Provisional Application Ser. No. 61/311,480, entitled "Next generation WLAN backwards compatible sounding frame," filed Mar. 8, 2010.
   1.5. U.S. Provisional Application Ser. No. 61/250,491, entitled "Multi-user multiple input multiple output preamble," filed Oct. 9, 2009.
   1.6. U.S. Provisional Application Ser. No. 61/255,690, entitled "Multi-user multiple input multiple output preamble," filed Oct. 28, 2009.
   1.7. U.S. Provisional Application Ser. No. 61/257,323, entitled "Multi-user multiple input multiple output preamble," filed Nov. 2, 2009.
   1.8. U.S. Provisional Application Ser. No. 61/321,430, entitled "Multi-user multiple input multiple output preamble," filed Apr. 6, 2010.

The U.S. Utility patent application Ser. No. 12/796,654 also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

2. U.S. Utility patent application Ser. No. 12/794,707, entitled "Cluster parsing for signaling within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
   2.1. U.S. Provisional Application Ser. No. 61/184,420, entitled "OFDMA cluster parsing and acknowledgement to OFDMA/MU-MIMO transmissions in WLAN device," filed Jun. 5, 2009.
   2.2. U.S. Provisional Application Ser. No. 61/185,153, entitled "OFDMA cluster parsing and acknowledgement to OFDMA/MU-MIMO transmissions in WLAN device," filed Jun. 8, 2009.

The U.S. Utility patent application Ser. No. 12/796,654 also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

3. U.S. Utility patent application Ser. No. 12/794,711, entitled "Transmission acknowledgement within multiple user, multiple access, and/or MIMO wireless communications," filed on Jun. 4, 2010, now U.S. Pat. No. 8,498,359, issued on Jul. 30, 2013, which claims priority pursuant to 35 U.S.C. §119(e) to the following U.S. Provisional Patent Applications which are hereby incorporated herein by reference in their entirety and made part of the present U.S. Utility Patent Application for all purposes:
   3.1. U.S. Provisional Application Ser. No. 61/184,420, entitled "OFDMA cluster parsing and acknowledgement to OFDMA/MU-MIMO transmissions in WLAN device," filed Jun. 5, 2009.
   3.2. U.S. Provisional Application Ser. No. 61/185,153, entitled "OFDMA cluster parsing and acknowledgement to OFDMA/MU-MIMO transmissions in WLAN device," filed Jun. 8, 2009.

Incorporation by Reference

The following U.S. Utility Patent Application is hereby incorporated herein by reference in its entirety and is made part of the present U.S. Utility Patent Application for all purposes:

1. U.S. Utility patent application Ser. No. 12/796,655, entitled "Group identification and definition within multiple user, multiple access, and/or MIMO wireless communications," filed concurrently with U.S. Utility patent application Ser. No. 12/796,654 on Jun. 8, 2010, now U.S. Pat. No. 8,526,351, issued on Sep. 3, 2013, and also incorporated therein by reference.

The following IEEE standard is hereby incorporated herein by reference in its entirety and is made part of the present U.S. Utility Patent Application for all purposes:

1. IEEE 802.11—2007, "IEEE Standard for Information technology—Telecommunications and information exchange between systems—Local and metropolitan area networks—Specific requirements; Part 11: Wireless LAN Medium Access Control (MAC) and Physical Layer (PHY)

Specifications," IEEE Computer Society, IEEE Std 802.11™—2007, (Revision of IEEE Std 802.11—1999), 1232 pages.

BACKGROUND OF THE INVENTION

1. Technical Field of the Invention

The invention relates generally to communication systems; and, more particularly, it relates to scheduled clear to send (CTS) within multiple user, multiple access, and/or MIMO wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-intput-single-output (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIGS. 7-9 are diagrams illustrating various embodiments for encoding the scrambled data.

FIG. 34, FIG. 35, FIG. 36, FIG. 37A, FIG. 37B, FIG. 38A, and FIG. 38B are diagrams illustrating various embodiments of methods for operating one or more wireless communication devices.

DETAILED DESCRIPTION OF THE INVENTION

Figure 1:
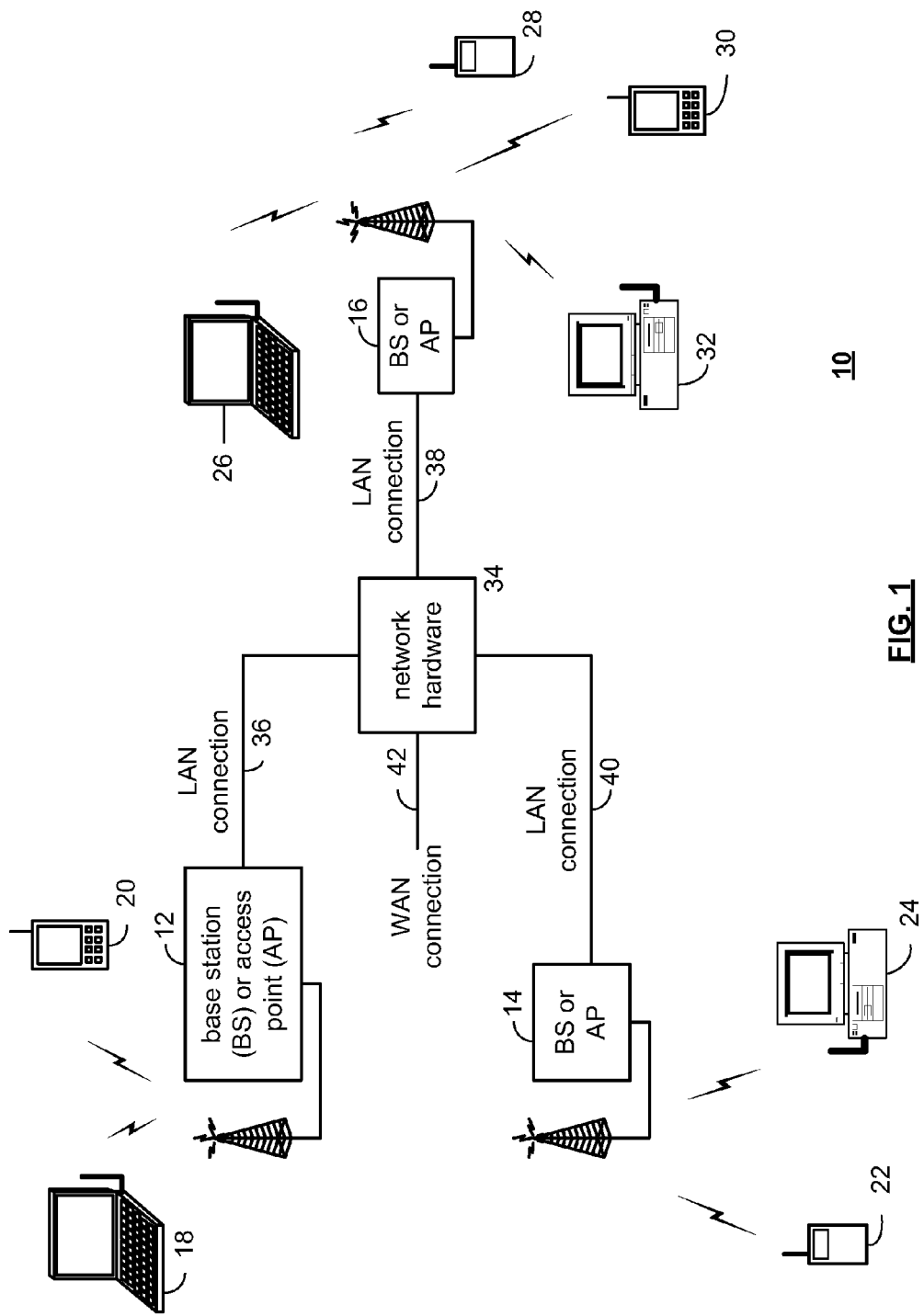
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
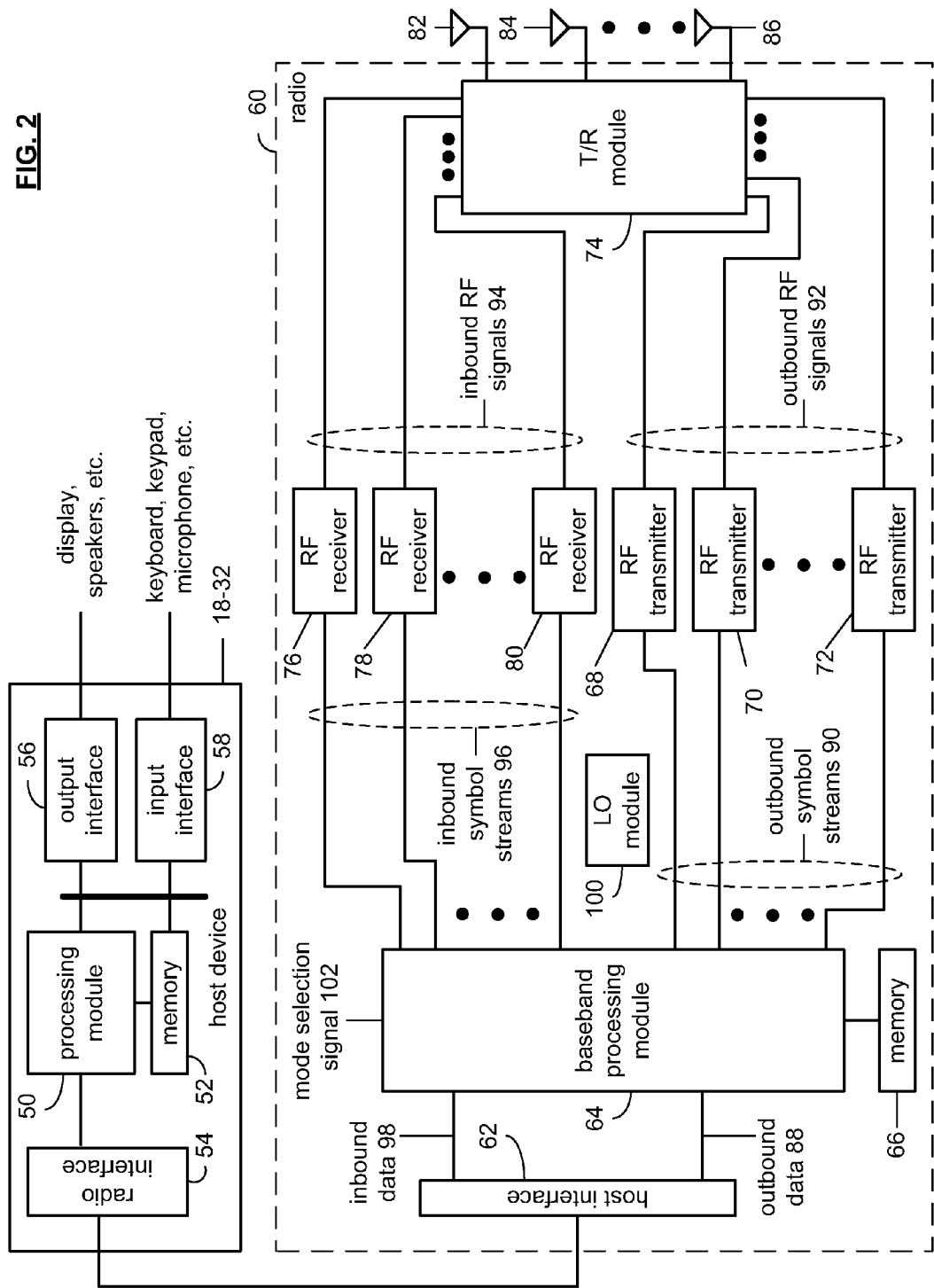
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
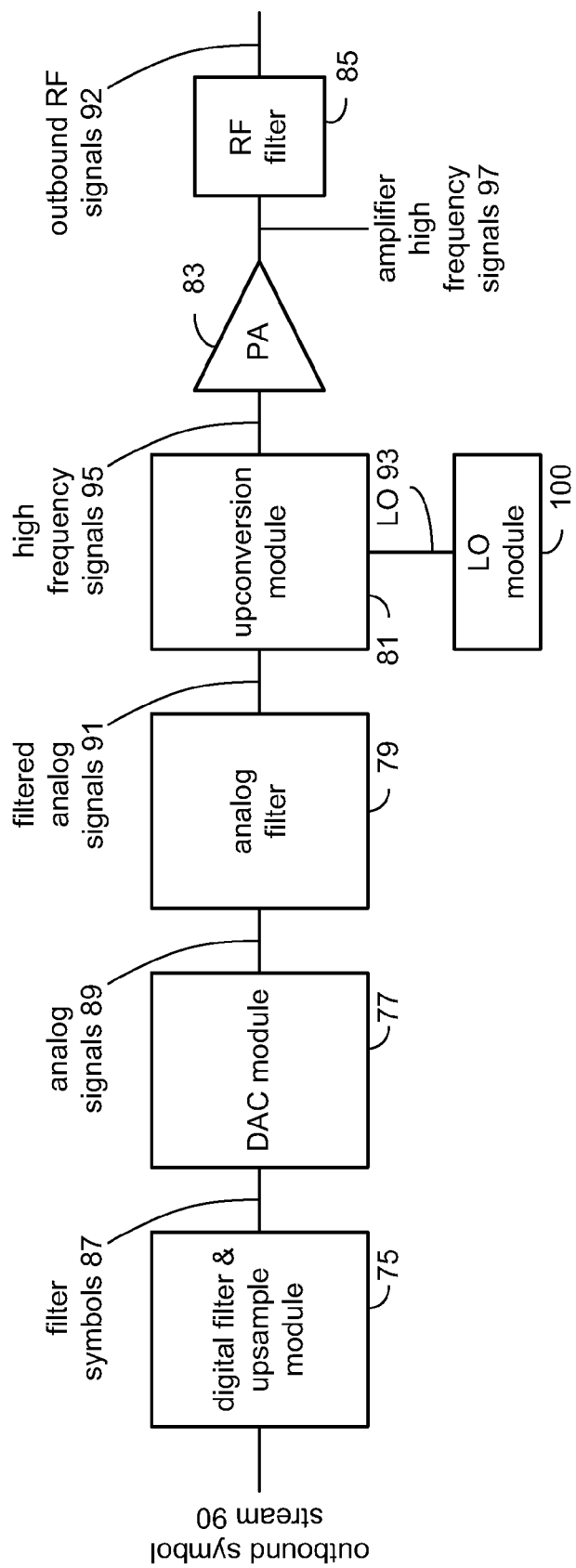
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
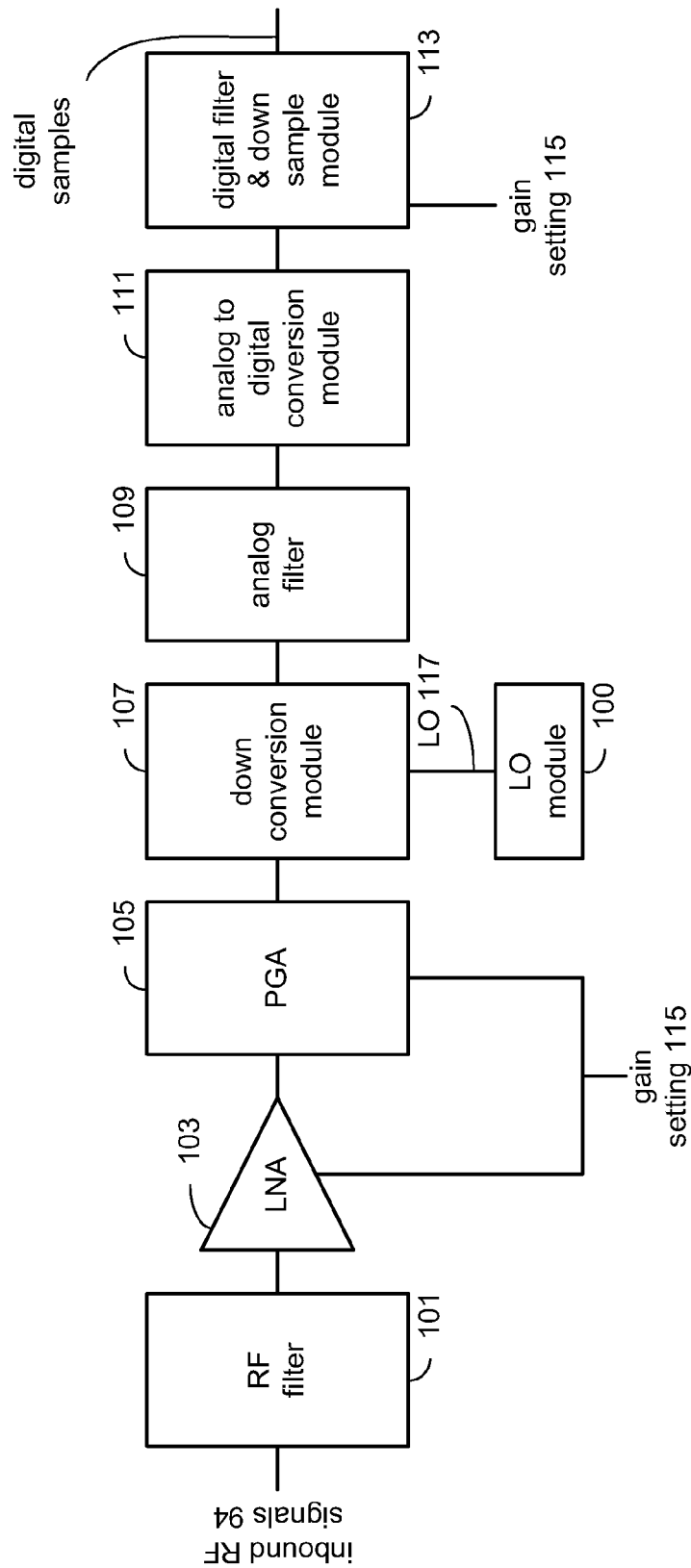
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
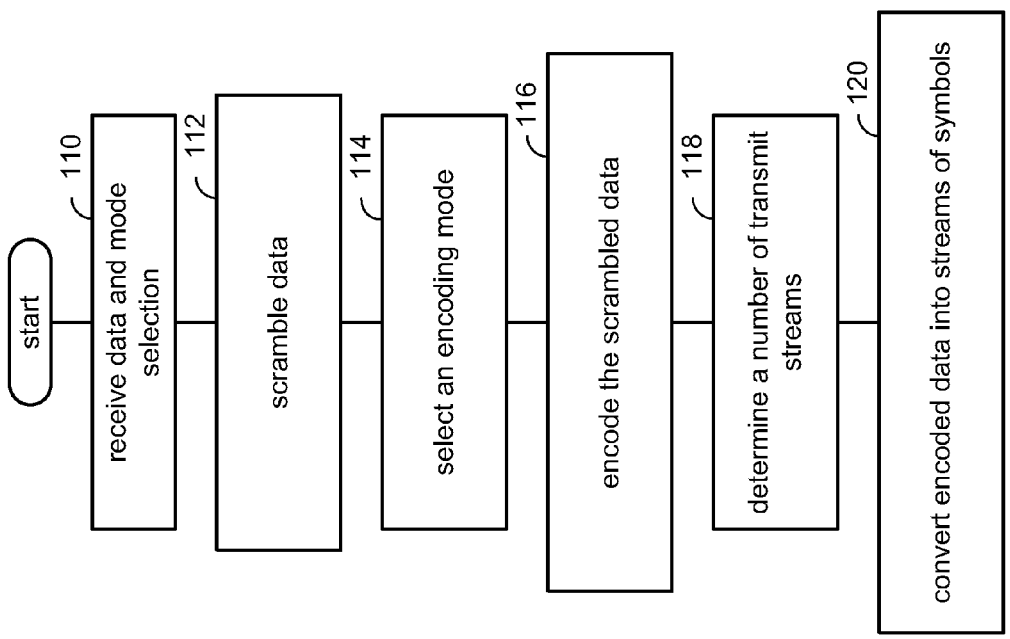
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
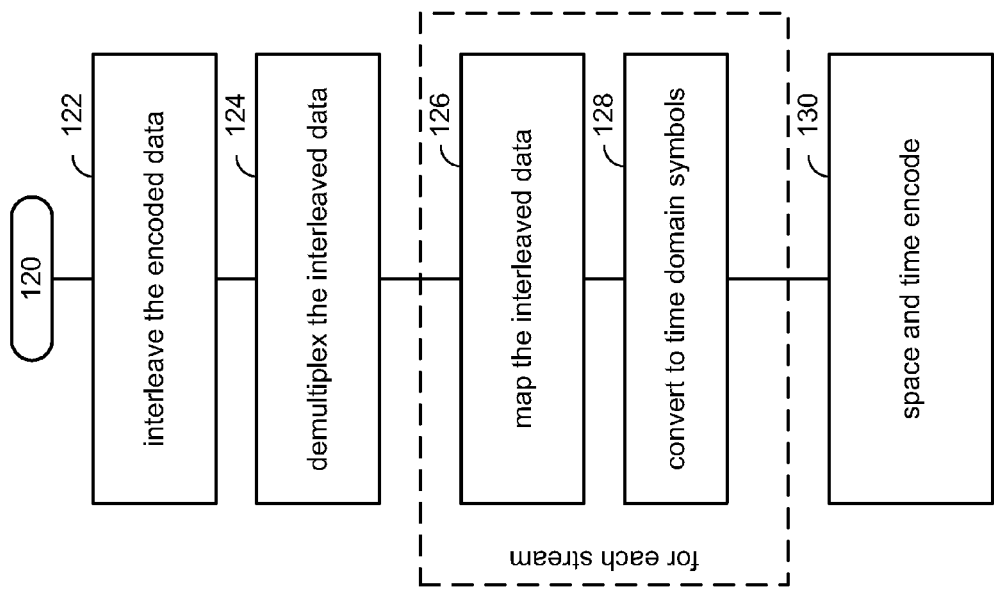
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \dots & C_{2M-1} & C_{2M} \\ -C_2^* & C_1^* & -C_4^* & C_3^* & \dots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
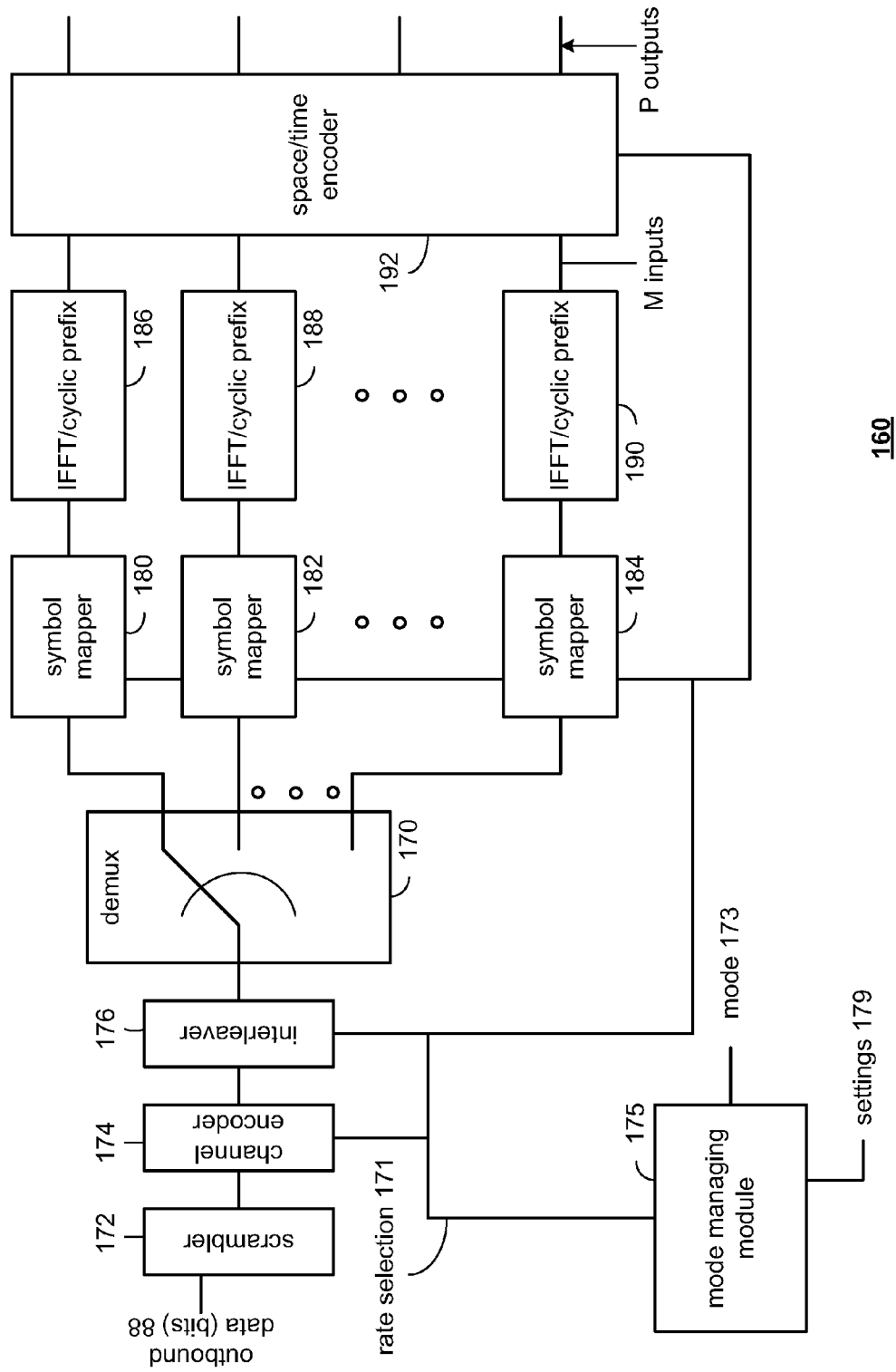
FIGS. 10A and 10B are diagrams illustrating embodiments of a radio transmitter.
Figure 10B:
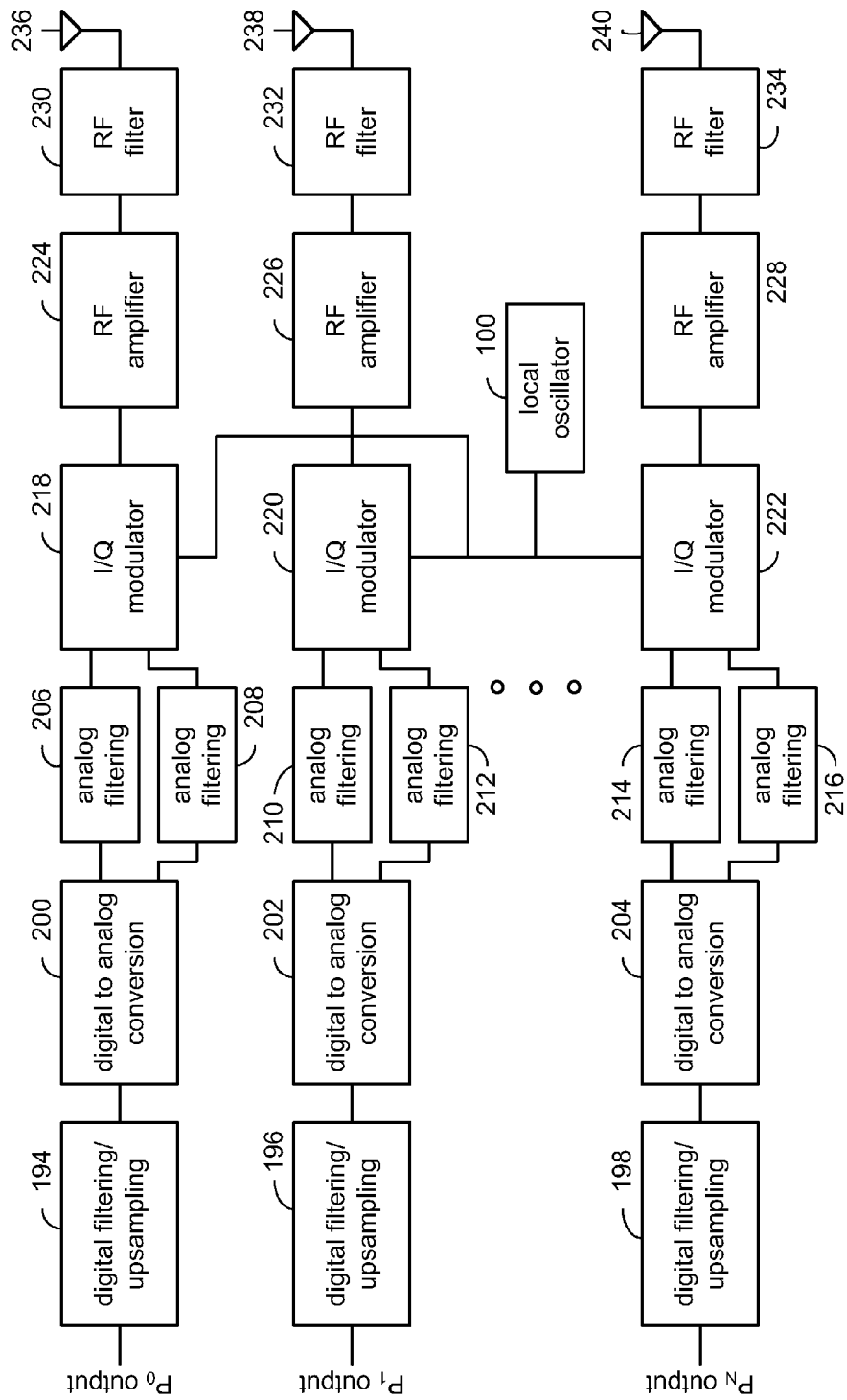

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
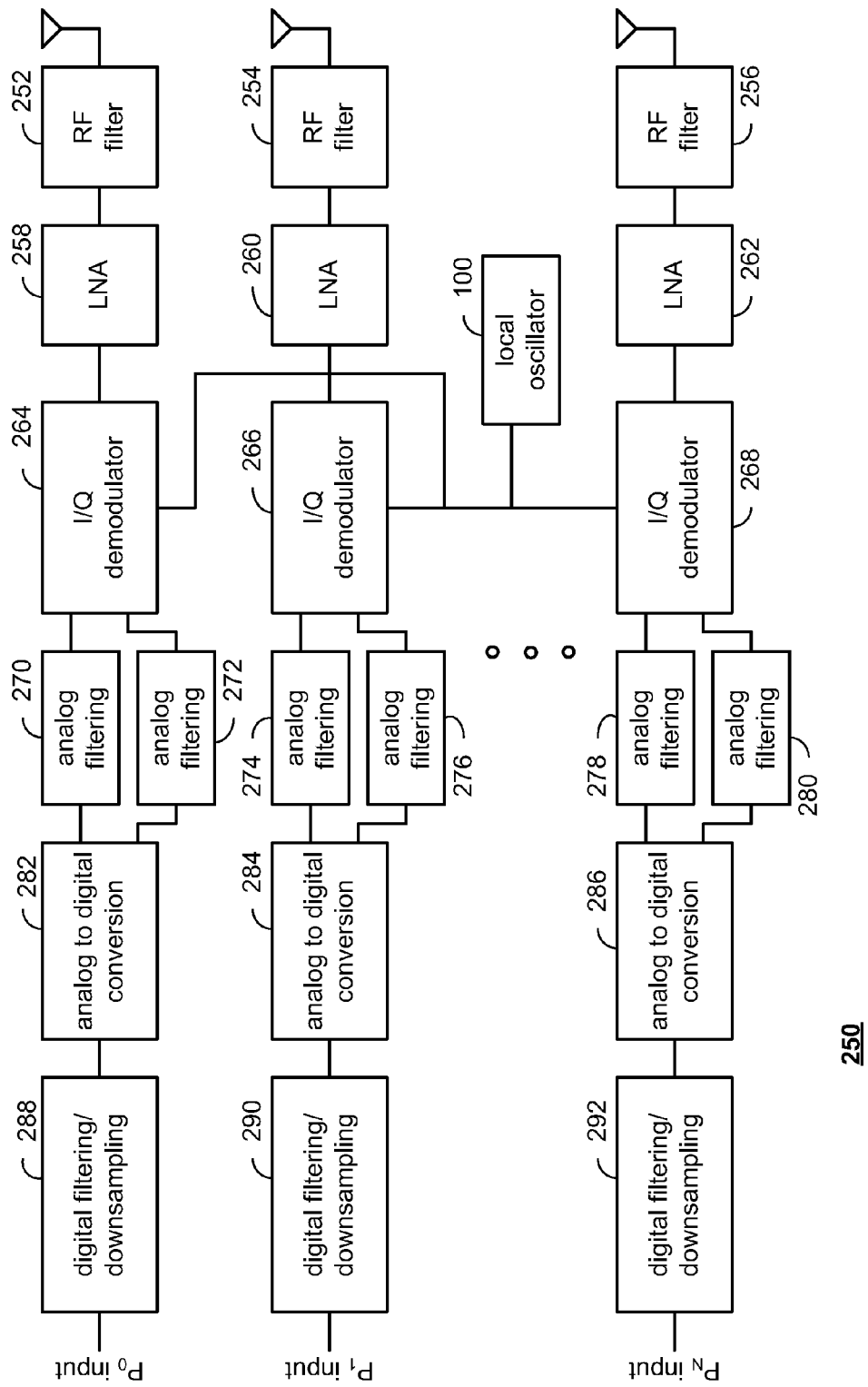
FIGS. 11A and 11B are diagrams illustrating embodiments of a radio receiver.
Figure 11B:
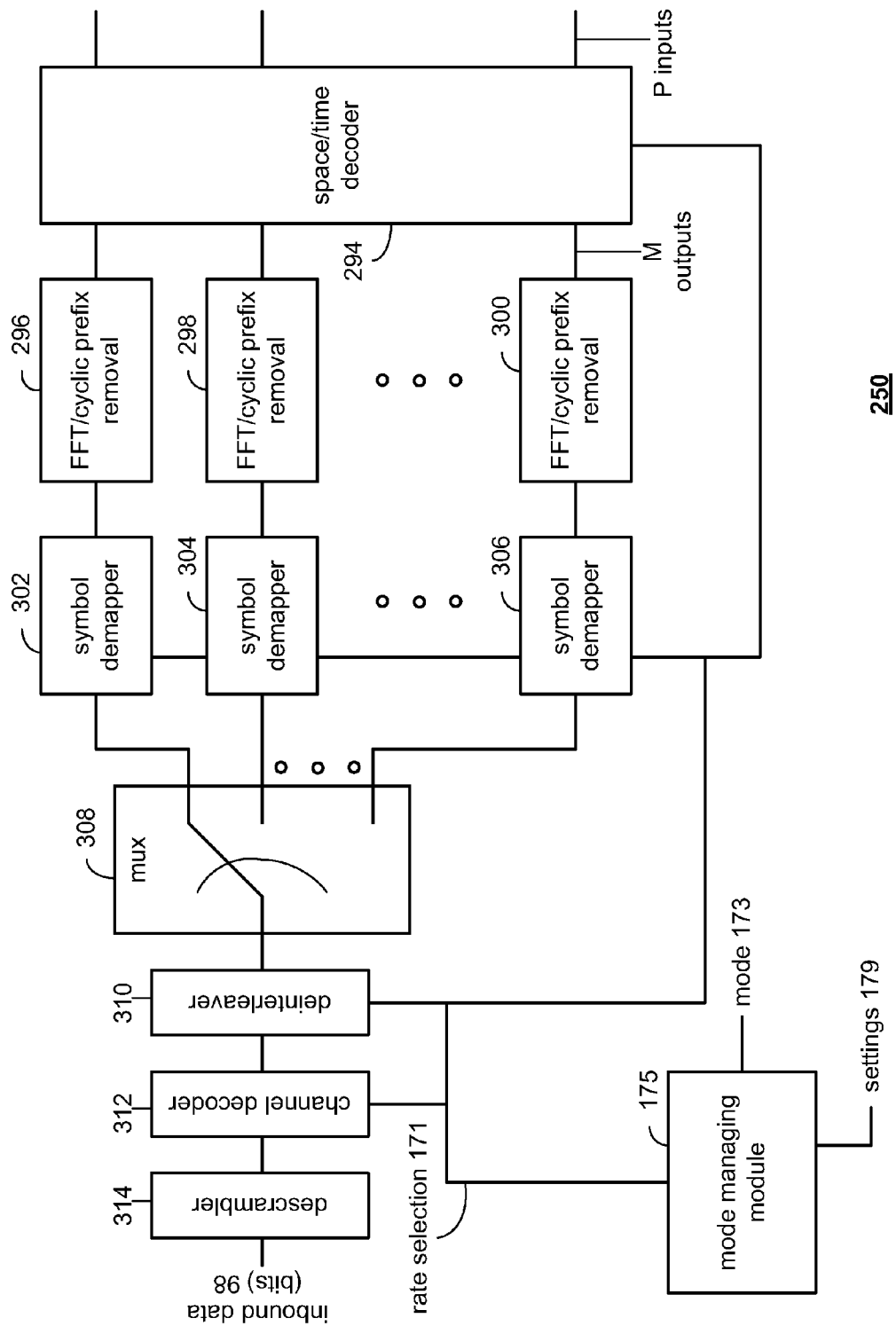

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
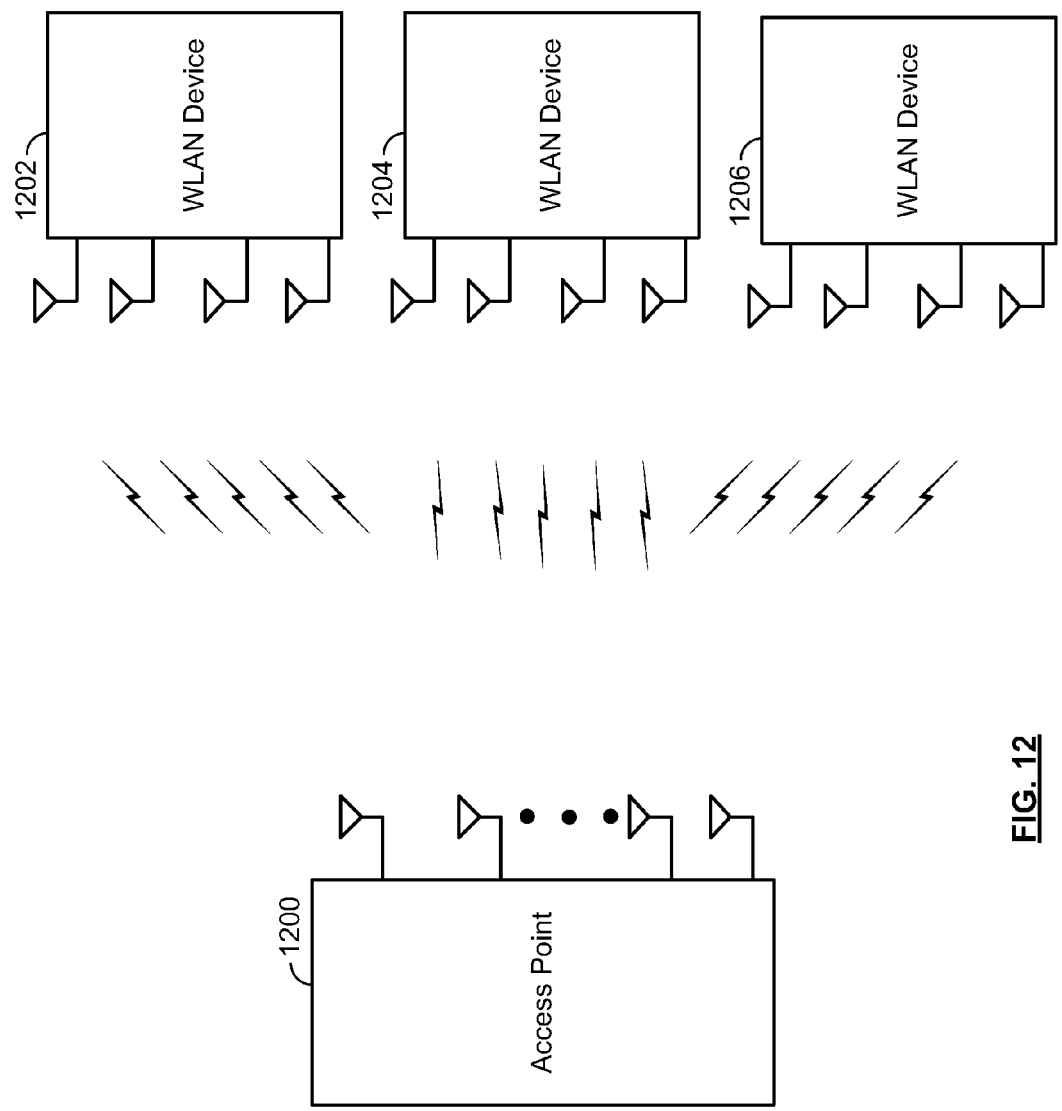
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards.

For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments.

Figure 13:
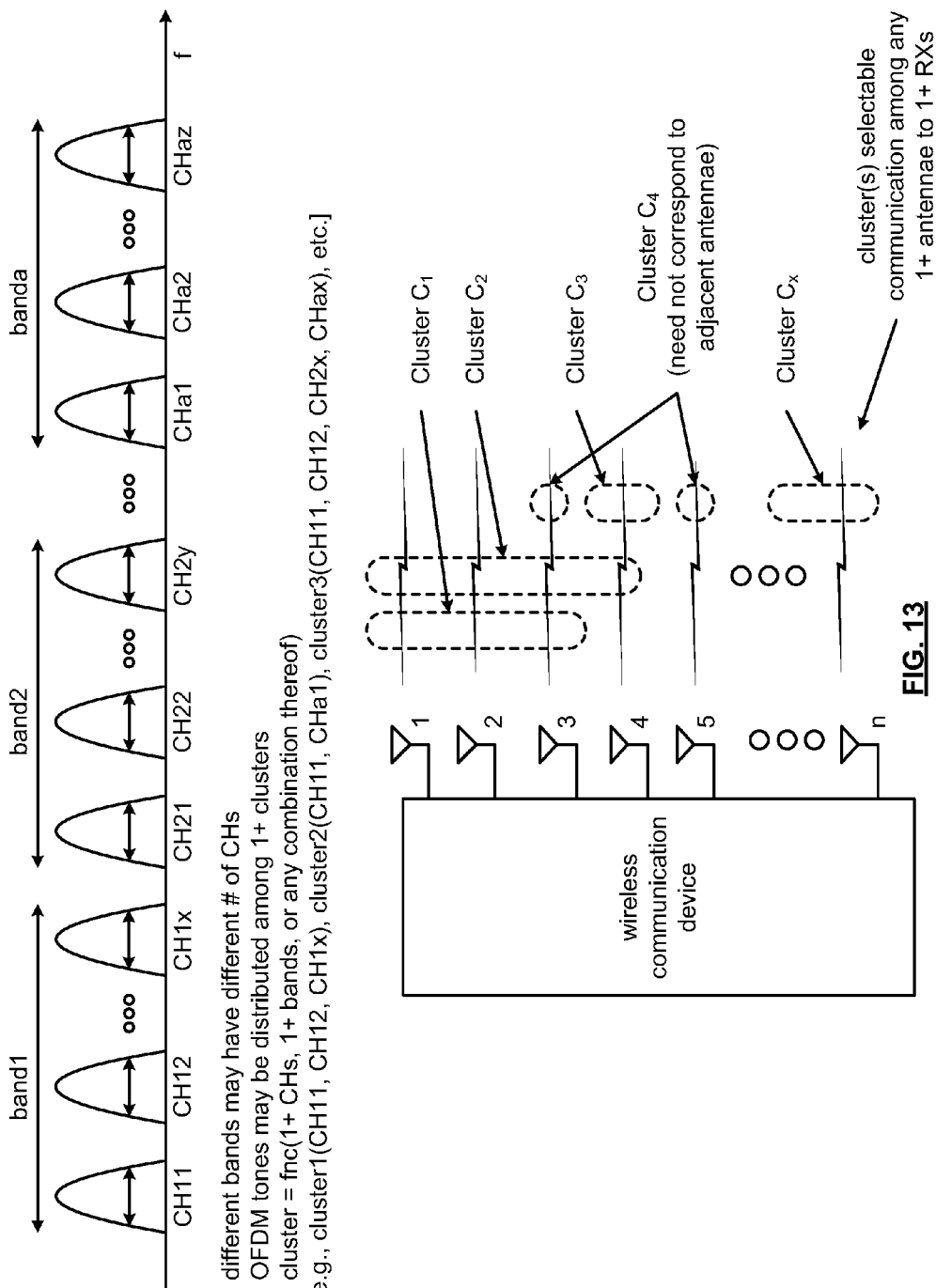
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Various means and approaches are presented herein, and equivalents, for performing request to send (RTS) and clear to send (CTS) exchanges to be made between a transmitting wireless communication device (e.g., an access point (AP)) and multiple receiving wireless communication devices (e.g., STAs) within a multi-user environment. Such RTS/CTS exchanges occur before subsequent data transmissions from the transmitting wireless communication device to at least one of the receiving wireless communication devices. These RTS/CTS exchanges are operative to reserve airtime and to establish medium ownership among the various wireless communication devices within the communication system.

Within multi-user communication systems (e.g., OFDMA, MU-MIMO, etc.), there are multiple receivers of the OFDMA, MU-MIMO, and/or OFDMA/MU-MIMO data transmissions. Consequently, the typical RTS/CTS exchange process known in the art simply cannot adequately deal with such multi-user communication systems. For example, a normal RTS/CTS exchange is performed between a single transmitting wireless communication device and a single receiving wireless communication device, whereas multi-user communication systems can include a single transmitting wireless communication device and a number of receiving wireless communication devices. In accordance with such an RTS and CTS exchange, one desired result is that the RTS and CTS both propagate medium occupancy information to as many devices in the area as is possible, especially those near the transmitting wireless communication device and those near the receiving wireless communication device. To achieve a similar objective within a multi-user communication system (an OFDMA/MU-MIMO context), RTS transmissions ideally need to reach all expected OFDMA receivers and all of them would then respond with a respective and corresponding CTS.

One embodiment may include sending a sequence of RTS frames followed by a sequence of CTS frames. Another embodiment would involve sending a single RTS frame and then receiving CTS frames from many or all of the intended wireless communication devices.

In accordance with certain aspects of the invention, a single transmission of an RTS may be made from a single transmitting wireless communication device to a number of receiving wireless communication devices. Such a single transmission may contain multiple RTS frames therein. Therefore, the single transmission may be provided concurrently to a number of receiving wireless communication devices, such that the single transmission includes respective portions therein corresponding to different receiving wireless communication devices within the communication system. Such a RTS transmission (that may include multiple RTS frames therein) is then followed by one or more CTS frames received from one, a subset, or all of the receiving wireless communication devices.

In one embodiment, the transmitting wireless communication device generates and transmits a multi-user request to send (mRTS) frame to a number of receiving wireless communication devices (e.g., STAs). The use of such an RTS may itself include information for scheduling the CTSs from the responding wireless communication devices. The mRTS frame can include information and instructions therein to direct the manner by which all or a subset of the receiving wireless communication devices are to provide CTS responses back to the transmitting wireless communication device. As such, an mRTS may be viewed as effectuating simultaneous RTS transmissions, such that OFDMA and/or MU-MIMO signaling may be employed to provide multiple RTSs simultaneously to a number receiving wireless communication devices.

Various operational parameters governing the manner by which these CTS responses are provided back to the transmitting wireless communication device may include an order by which they are to be respectively provided from the various receiving wireless communication devices, one or more respective clusters on which the CTS responses are to be made, the type of signaling by which the responses are to be sent, among other operational parameters. For example, the mRTS frame may be an OFDMA frame, a MU-MIMO frame, or a combination thereof. The CTS responses may be received in accordance with any one or combination of OFDM signaling, OFDMA signaling, and MU-MIMO signaling.

In another embodiment, the wireless communication device transmits (sometimes simultaneously) RTS frames respectively to the receiving wireless communication devices. For example, SIMRTS (simultaneous RTS transmissions) may operate using OFDMA and/or MU-MIMO techniques. Such an OFDMA and/or MU-MIMO frame can include a typical RTS frame format therein, and when it is received by multiple receiving wireless communication devices, each respective wireless communication device responds with a respective CTS in turn. The response sequence may be established through separate management frame exchange. Alternatively, information contained within the RTS related transmission can include information establishing the response sequence.

The use of a flexible RTS type and formatting allows for use for either single or multiple radio frequency (RF) chains to be implemented within an RTS transmitting wireless communication device.

Again, the CTS order or sequence may be scheduled in response to a multi-user RTS (mRTS). Such an mRTS frame may be sent in accordance with any of a number of manners (e.g., omni-directional or not, etc.). When operating in accordance with omni-directional transmission of an mRTS frame, the mRTS coverage is maximized. The CTS frame sent back from the receiving wireless communication devices to the transmitting wireless communication device may or may not be omni-directional (e.g., depending on CTS scheduling employed in a particular situation).

Again, in some embodiments, an mRTS frame may be sent from a transmitting wireless communication device as an OFDMA/MU-MIMO transmission. Such an mRTS/CTS exchange then provides coverage for all necessary airspace for airtime reservation (e.g., including information related to coverage around the RTS transmitting wireless communication device and coverage around each respective CTS sender [the receiving wireless communication devices in the communication system]).

Figure 14:
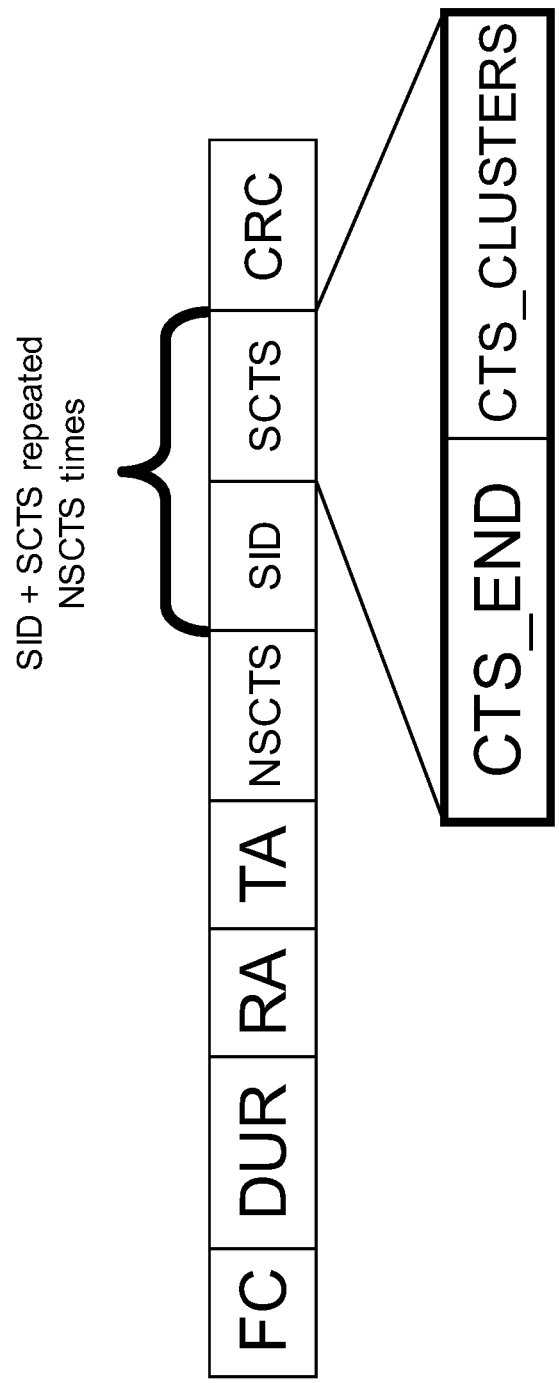
FIG. 14 is a diagram illustrating an embodiment of multi-user request to send (mRTS) frame.

FIG. 14 is a diagram illustrating an embodiment of multi-user request to send (mRTS) frame. The mRTS frame format includes various field therein such as frame control (FC), duration (DUR), receiver address (RA), transmitter address (TA), and cyclic redundancy check (CRC).

The mRTS frame format also includes an NSCTS frame that indicates a number of following SID+SCTS fields. The SID field may be an AID or 48-bit MAC address that identifies which station (i.e., receiving wireless communication device, STA, etc.) will transmit a response CTS at the time specified by the CTS_END value. The SCTS field includes two components therein, CTS_CLUSTERS and CTS_END. The CTS_CLUSTERS field indicates one or more clusters to be used for a CTS transmission by a receiving wireless communication device (e.g., STA) corresponding to SID value. The CTS_END field provides the end time of a window to be employed for the CTS transmission for this SID. This also allows spacing of sequential CTS transmissions for a transmitting wireless communication device not having OFDMA receiver capability (e.g., can only receive one CTS at a time). A CTS_END value of ZERO indicates that a corresponding receiving wireless communication device (e.g., STA) to SID does not transmit CTS, but it is instead a receiving wireless communication device (e.g., STA) that will be included in a subsequent MU-MIMO transmission. This can provide opportunity for other MU-MIMO receivers to be able to use a transmission beamforming vector for other MU-MIMO receiving wireless communication devices (e.g., STAs) to improve the probability of successful reception of their MU-MIMO portion.

As mentioned elsewhere, the CTS transmissions sent back from the receiving wireless communication devices to the transmitting wireless communication device may be scheduled in a number of ways. In one embodiment, an mRTS frame may be transmitted as any combination of OFDMA and/or MU-MIMO. As such, the mRTS is then directed to multiple receiving wireless communication devices, such that each respective receiving wireless communication device responds with a respective CTS as directed by the individually addressed mRTS explicit scheduling information. In other words, the mRTS itself includes scheduling information therein to direct the manner by which the respective receiving wireless communication devices are to provide their respective CTSs. Again, scheduling information may include and correspond to a number of operational parameters such as order/sequence, which one or more clusters on which respective CTSs are to be send, CTS_END, etc. Such an mRTS frame may also include SID. It is noted that SID generally is not needed if cluster and CTS_END information is placed in a MAC frame which already has address (i.e. receiving wireless communication device or STA identifier) information, but it may be needed if the information is placed in a PHY header. An mRTS sent using OFDMA/MU-MIMO frame format can contain multiple distinct RTS frames therein, such that each of the multiple RTSs therein can have a respective, unique receiver address (RA) and/or SID. If a receiving wireless communication device is named as RA or SID within an RTS, then that recipient will respond with a CTS, of course, provided that the network allocation vector (NAV) at the receiving wireless communication device is not set, thereby allowing a CTS transmission to be made. As such, the respective CTSs from the respective receiving wireless communication devices are transmitted according to information contained in the RTS itself that includes such CTS response instructions corresponding respective to each of the receiving wireless communication devices (e.g., one or more clusters and CTS_END used for transmission of CTS may be found in the RTS, either in PHY header or MAC portion of frame).

With respect to scheduling considerations from the perspective of the transmitting wireless communication device, the mRTS or SIMRTS transmitting wireless communication device may be implemented to determine schedule according to various parameters such as the transmitting wireless communication device's receive capability. That is to say, a transmitting wireless communication device may not have certain receive capabilities, and the manner in which the CTSs are scheduled can consider such capabilities and/or limitations of the transmitting wireless communication device.

For example, consideration may be made with respect to MU-MIMO receive capability or lack thereof, OFDMA receive capability or lack thereof, the desired coverage for CTS reception, the expected vs. desired maximum overhead of the RTS/CTS exchanges, the transmit capability of the respective receiving wireless communication devices (e.g. OFDM, OFDMA, etc.).

The scheduling of the CTSs from the receiving wireless communication devices may be made directly in response to the mRTS frame sent from the transmitting wireless communication device, and specifically as per the instructions within the mRTS frame. When operating in accordance with a SIMRTS transmission, scheduling may be performed as per instructions that are valid from a most recent/last management information exchange between the transmitting wireless communication device and the receiving wireless communication devices. Such management frames may be implemented to contain SCTS field, where the SCTS fields describe one or more clusters and timing to be used by each respective SID-matching receiving wireless communication device (e.g., STA) following receipt of a SIMRTS transmission.

The contents of the various CTSs sent back from the receiving wireless communication devices to the transmitting wireless communication device include information that is specific to the RTS that had requested the CTS response. For example, if an OFDMA transmission contains N distinct RTS frames therein, then N distinct CTS responses may be generated from the respective receiving wireless communication devices indicated. The RA, TA, DUR and/or other fields of a respective CTS response may be determined from the RTS that generates the CTS response.

It is noted that a CTS might not be generated in some instances (e.g., depending on cluster conditions). For example, if the RTS was not received at the RA of the RTS, then no CTS is generated (such as may result from a collision of transmissions, a CRC failure, etc.). As another example, a CTS may not be generated for a cluster if the network allocation vector (NAV) for the cluster, being indicated as the cluster on which the CTS is to be transmitted, does not correspond to the TA of the RTS. In a specific situation, per-cluster NAV information may be necessary to be able to respond properly to RTS with a CTS.

Various and multiple examples are provide herein for various embodiments of RTS and CTS exchanges that may be performed in accordance with certain aspects of the invention including order, sequence, timing, cluster, signaling format, antenna configuration, etc. It is also noted that these specific examples and embodiments are not exhaustive, and the principles described herein may be adapted to accommodate any desired configuration and manner of performing RTS and CTS exchange in accordance with these selectable principles.

In several of the diagrams employed herein, STA is generally used to refer to a receiving wireless communication device (where STA1 corresponds to a first receiving wireless communication device, STA2 corresponds to a second receiving wireless communication device, etc.). Generally, a transmitting wireless communication device that transmits such an mRTS frame can be an access point (AP), though a STA may also transmit such an mRTS frame to other STAs (and/or one or more AP) in certain embodiments.

After performing RTS and CTS exchanges, various manners of data exchange may be performed in the various embodiments including using MU-MIMO data transmission, OFDMA data transmission, MU-MIMO/OFDMA data transmission, and correspondingly various manners of providing acknowledgements (ACKs) from the receiving wireless communication devices to the transmitting wireless communication device based thereon.

FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, and FIG. 33 are diagram illustrating various embodiments of request to send (RTS) and clear to send (CTS) exchanges among various wireless communication devices.

Figure 15:
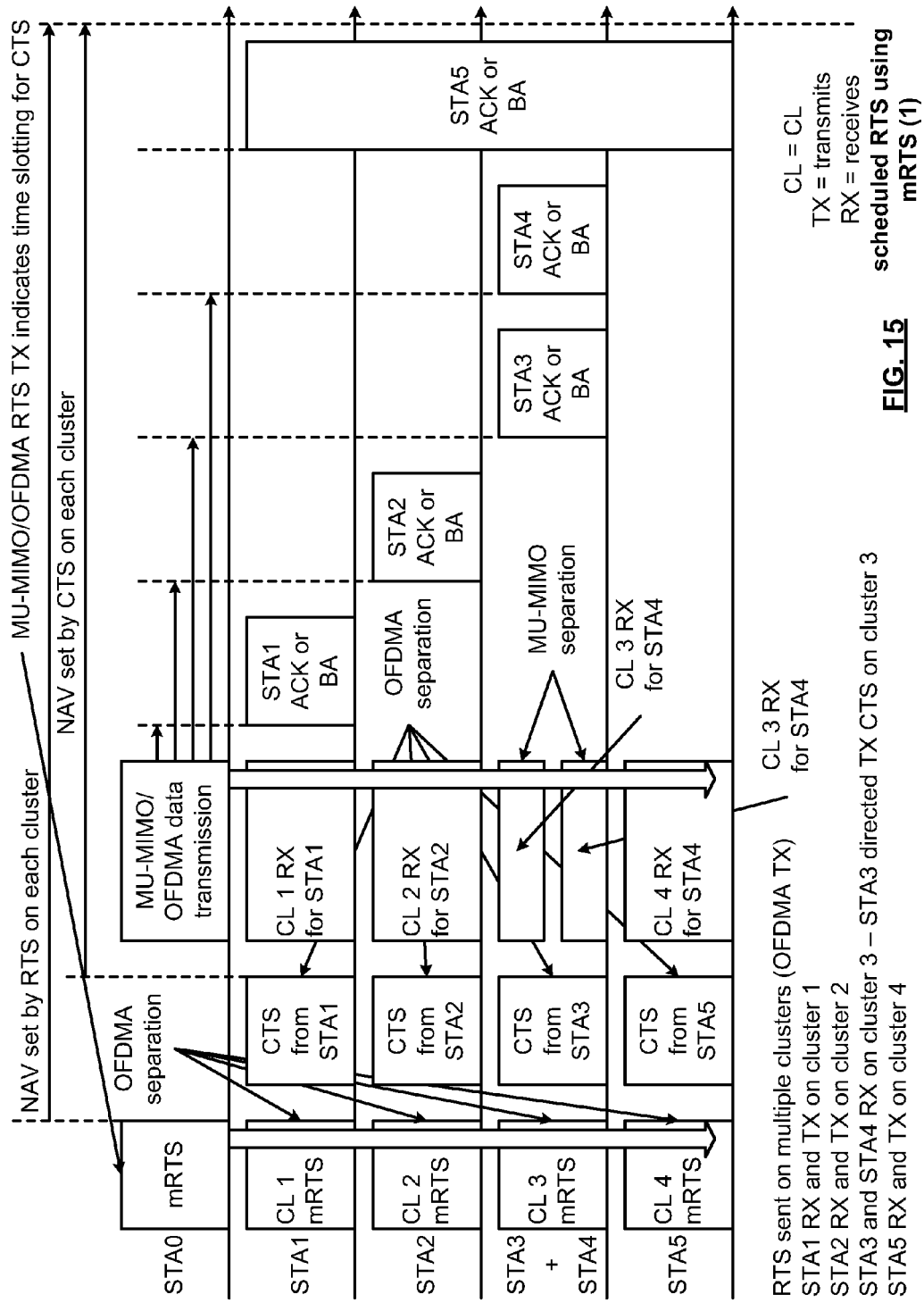
FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, and FIG. 33 are diagram illustrating various embodiments of request to send (RTS) and clear to send (CTS) exchanges among various wireless communication devices.

Referring to FIG. 15, within this embodiment, a MU-MIMO/OFDMA RTS is sent to the multiple STAs on multiple clusters. STA1 transmits and receives on cluster 1, and STA2 transmits and receives on cluster 2. STA3 and STA4 receive on cluster 3, and STA3 is directed to transmit CTS on cluster 3. STA5 transmits and receives on cluster 4. In this embodiment, respective CTSs from the STAs are transmitted concurrently.

Figure 16:
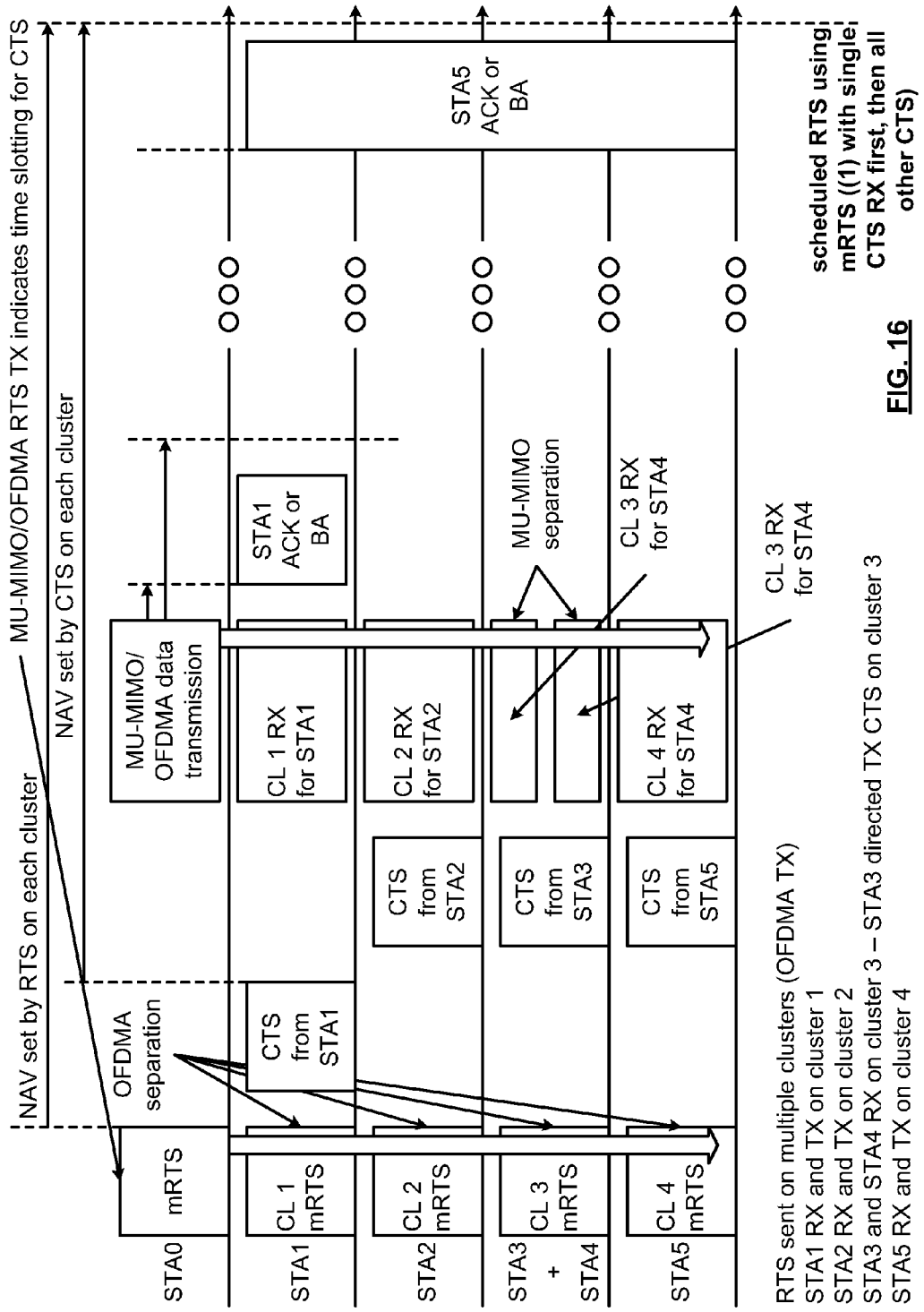

Referring to FIG. 16, this embodiment is analogous to the previous embodiment, with at least one difference being that a single CTS is firstly received from STA1, and then the respective CTSs from the STAs are secondly received. As such, the transmitting wireless communication device receives one of the CTSs up front, and then all of the other CTSs are subsequently received.

Figure 17:
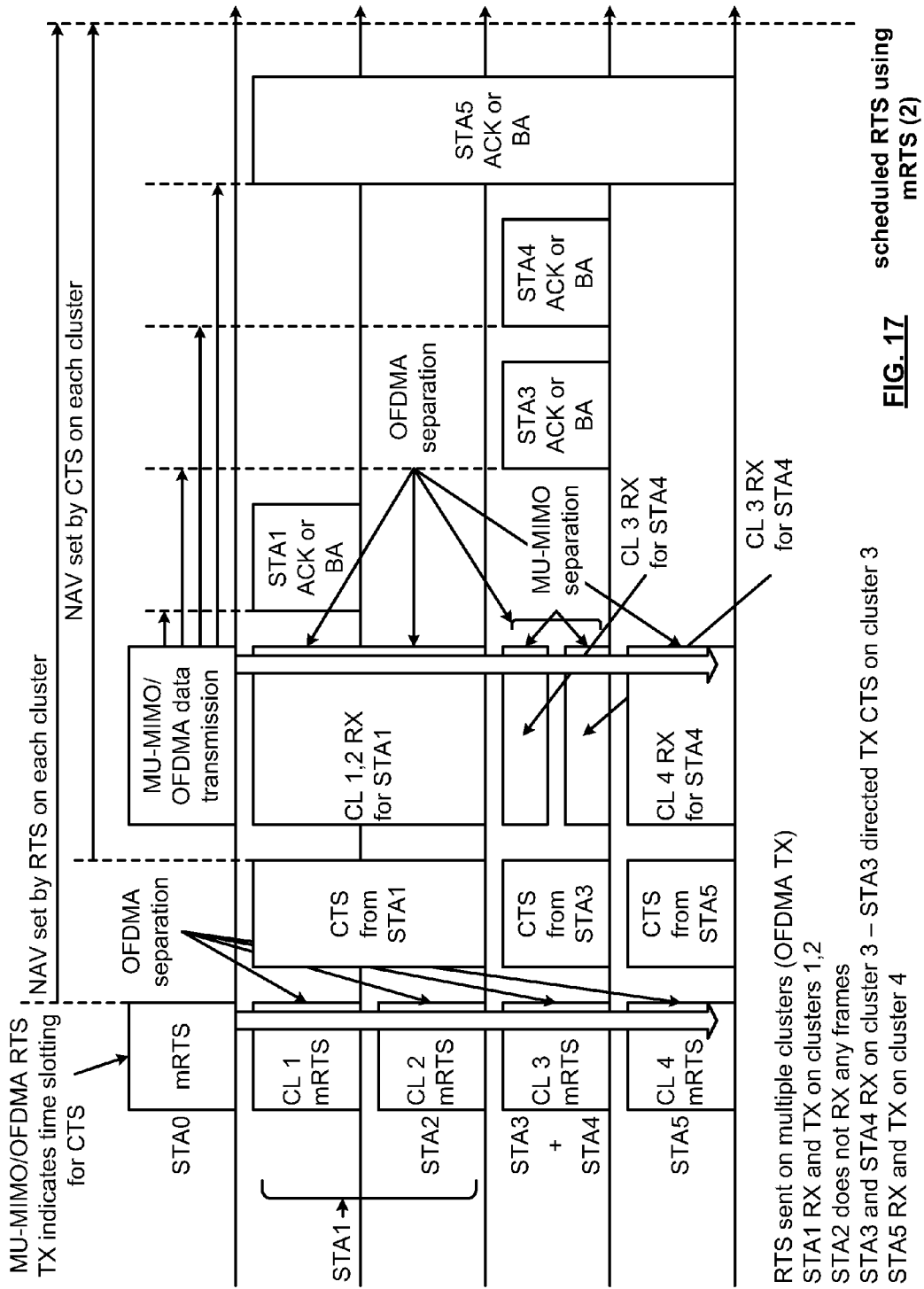

Referring to FIG. 17, within this embodiment, an OFDMA RTS is sent to the multiple STAs on multiple clusters. STA1 transmits and receives on cluster 1, and STA2 does not receive any frames. STA3 and STA4 receive on cluster 3, and STA3 is directed to transmit CTS on cluster 3. As can be seen, STA3 and STA4 also operate in accordance with MU-MIMO separation. STA5 transmits and receives on cluster 4.

Figure 18:
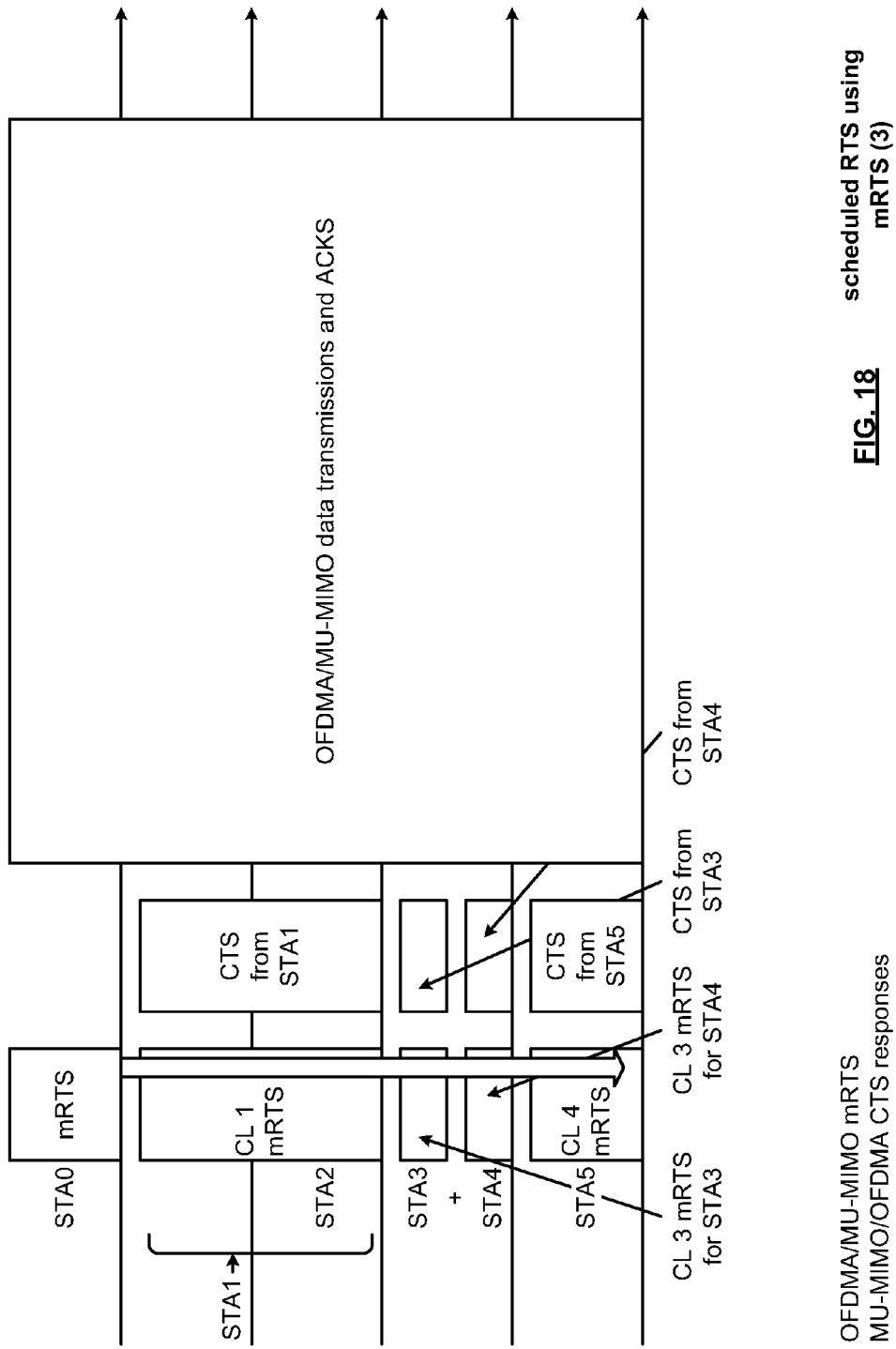

Referring to FIG. 18, within this embodiment, an OFDMA/MU-MIMO mRTS is sent to the multiple STAs on multiple clusters, and the CTS responses are provided back from the STAs to the transmitting wireless communication device in accordance with MU-MIMO/OFDMA signaling.

Figure 19:
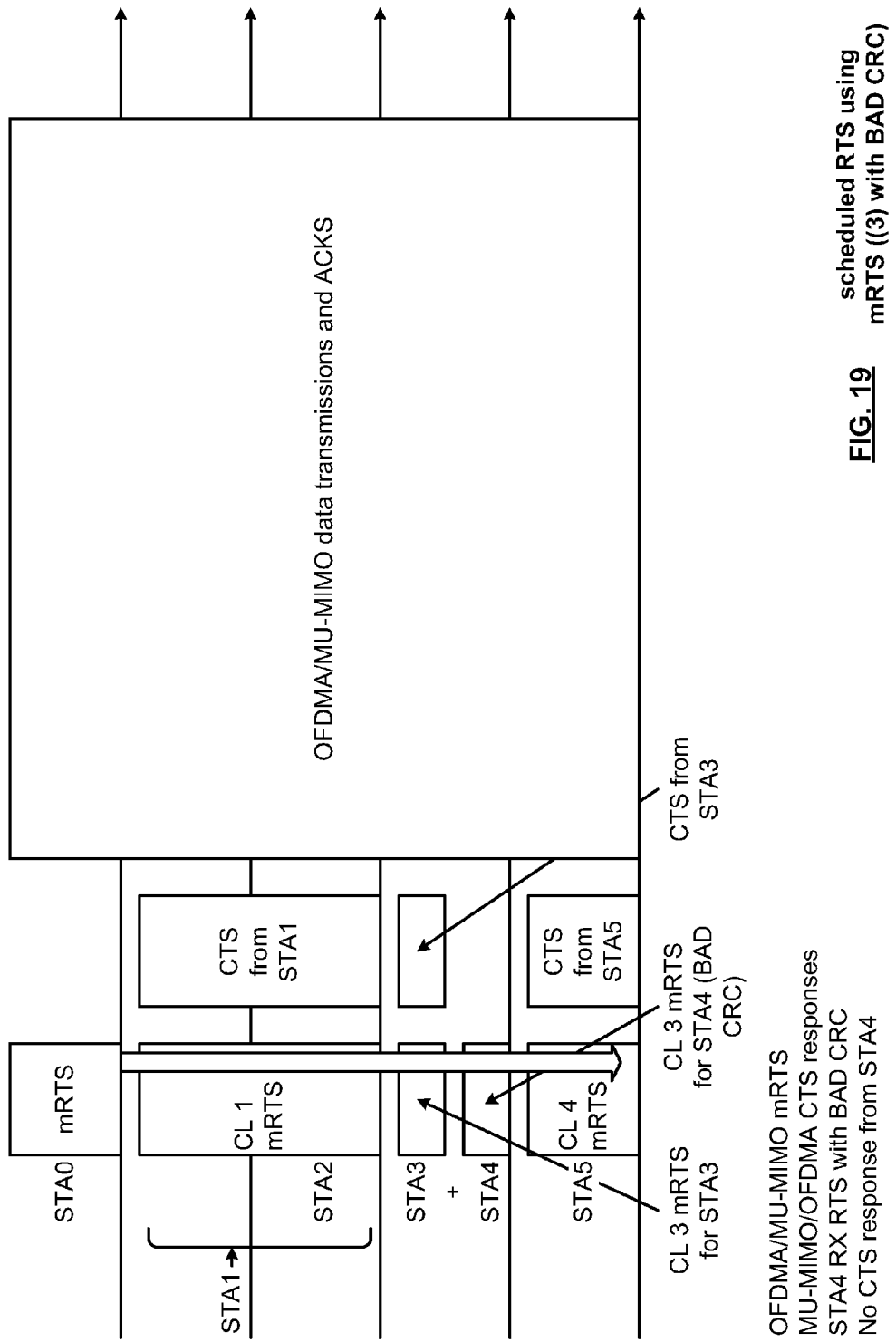

Referring to FIG. 19, this embodiment is analogous to the previous embodiment, with at least one difference being that a bad CRC is identified (e.g., CRC does not pass) for the RTS received at STA4. As such, no CTS response is provided from STA4.

Figure 20:
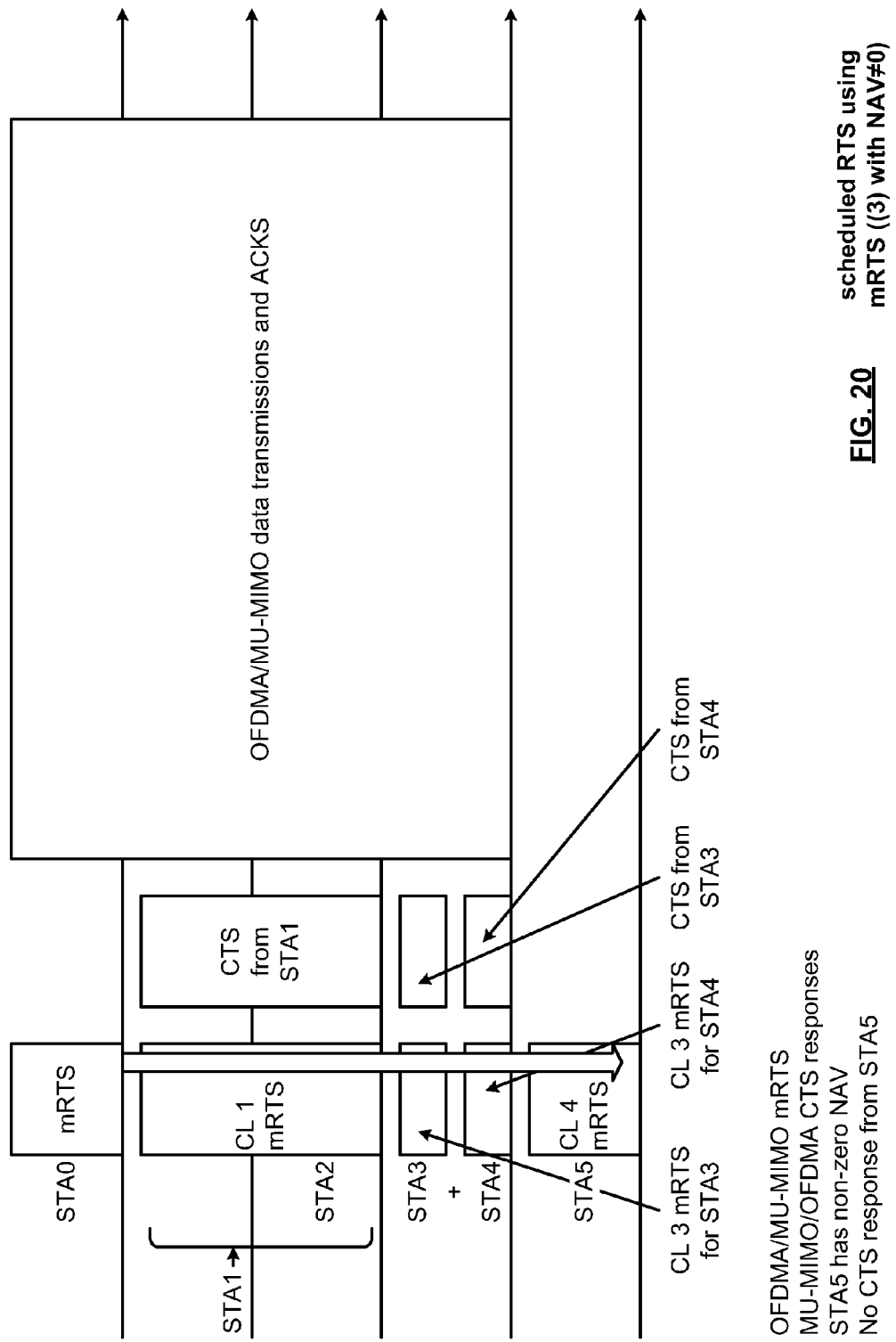

Referring to FIG. 20, within this embodiment, an OFDMA/MU-MIMO mRTS is sent to the multiple STAs on multiple clusters, and the CTS responses are provided back from the STAs to the transmitting wireless communication device in accordance with MU-MIMO/OFDMA signaling. Also, within this embodiment, the network allocation vector (NAV) is non-zero with respect to STA5, and as such, no CTS response is provided from STA5.

Figure 21:
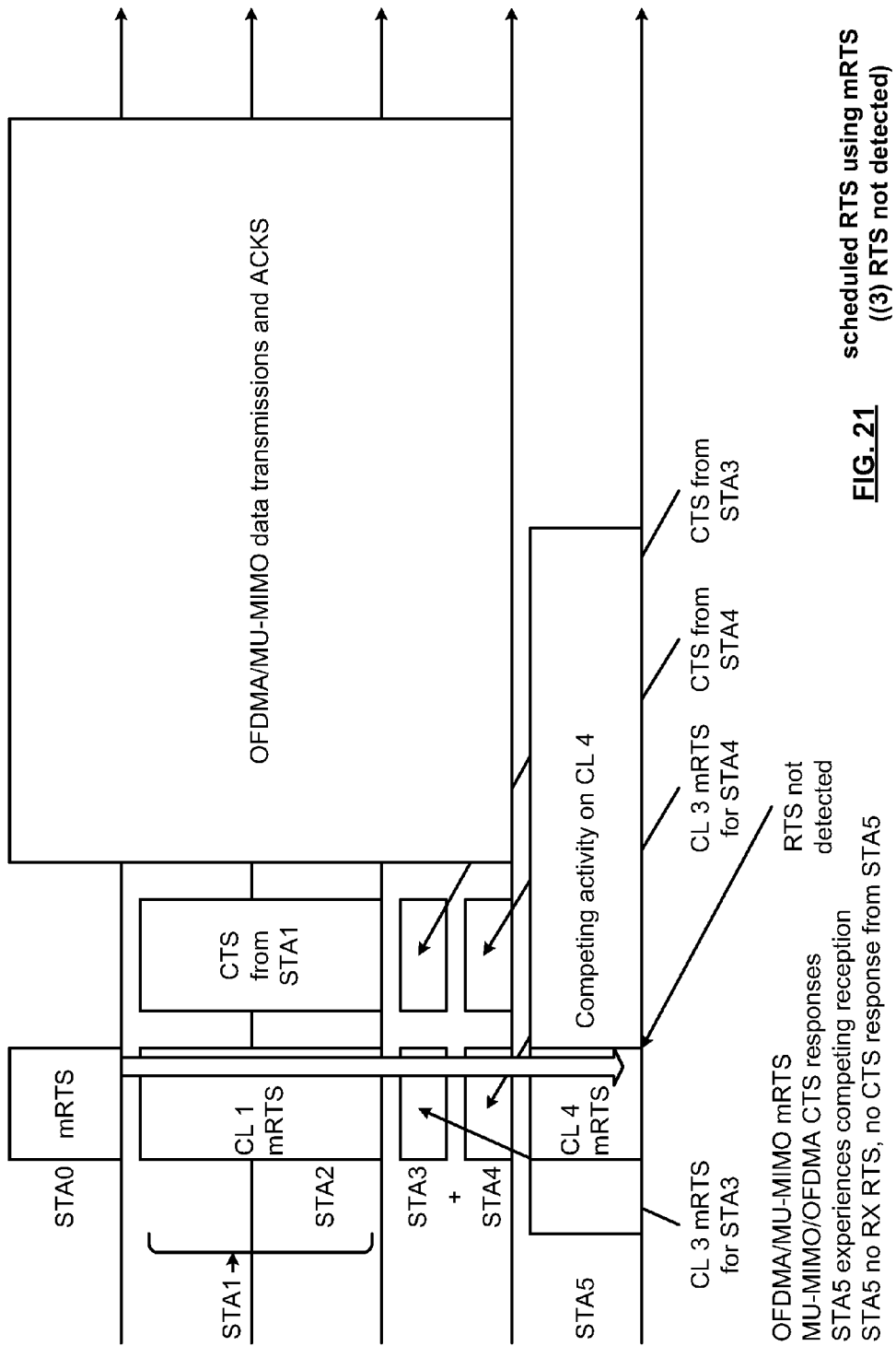

Referring to FIG. 21, within this embodiment, an OFDMA/MU-MIMO mRTS is sent to the multiple STAs on multiple clusters, and the CTS responses are provided back from the STAs to the transmitting wireless communication device in accordance with MU-MIMO/OFDMA signaling. Also, within this embodiment, STA5 is experiencing competing reception. As a result of this competing reception, STA5 never does receive RTS, and as such, no CTS response is provided from STA5.

Figure 22:
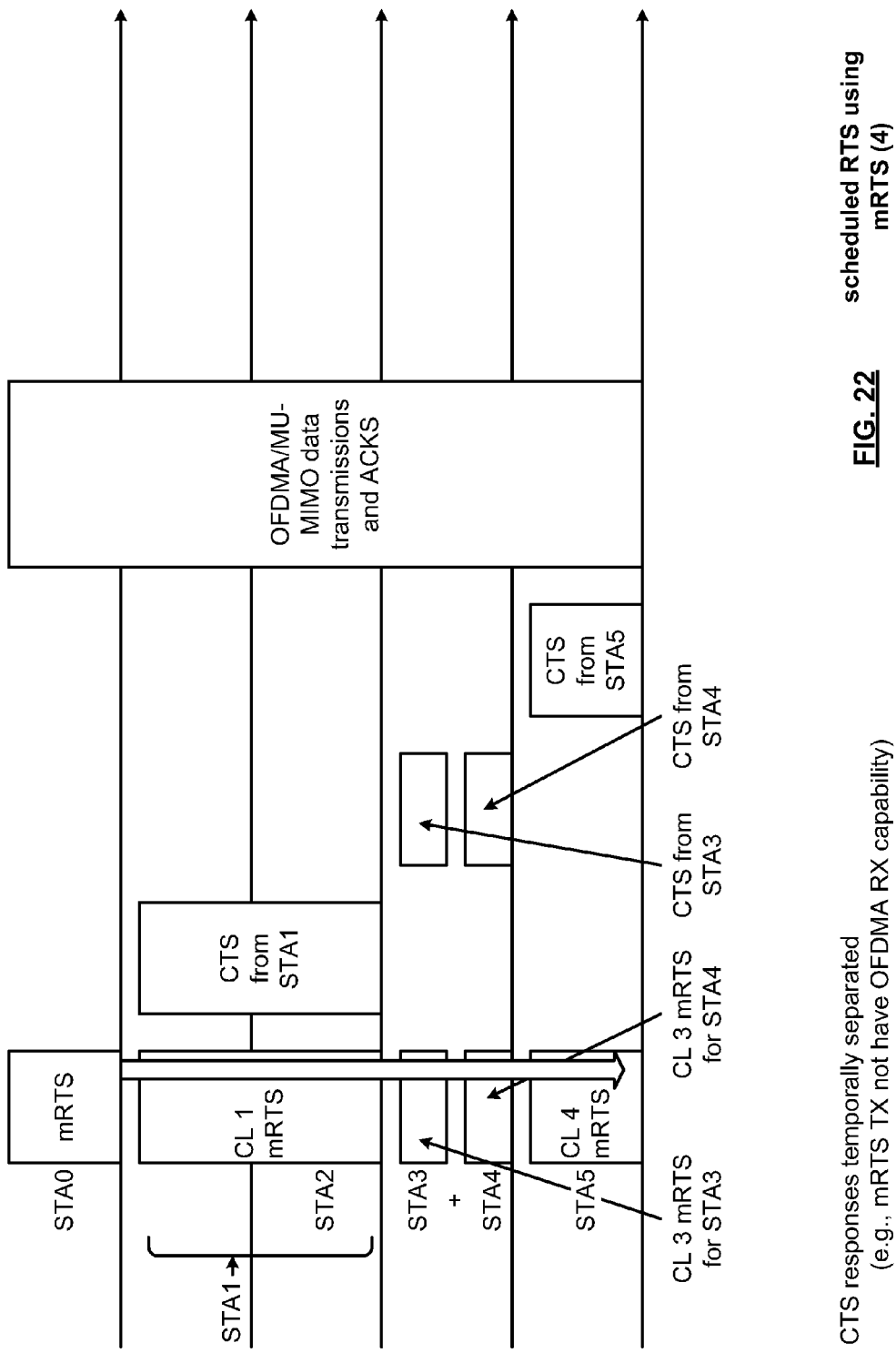

Referring to FIG. 22, this embodiment shows the temporal separation of CTS responses. Such scheduling may be needed in a situation where the transmitting wireless communication device (that sends the mRTS frame) does not have OFDMA receive capability.

Figure 23:
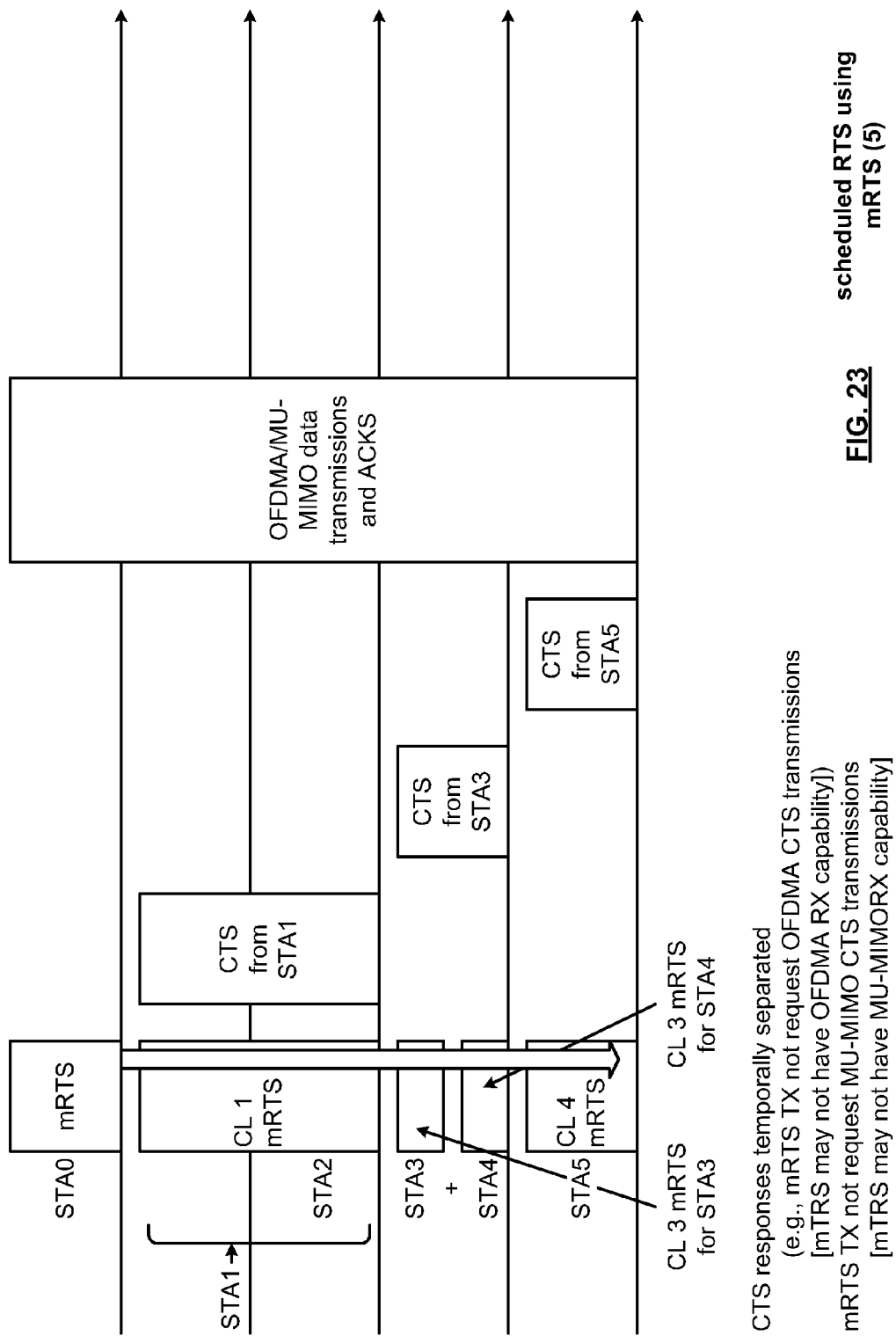

Referring to FIG. 23, this embodiment also shows temporal separation of the CTS responses sent from the various receiving wireless communication devices. For example, mRTS transmitting wireless communication device does not request OFDMA CTS transmissions in this diagram. Again, the mRTS transmitting wireless communication device may not have OFDMA receive capability.

The mRTS transmitting wireless communication device may not request MU-MIMO CTS transmissions from the respective receiving wireless communication devices (e.g., when the mRTS transmitting wireless communication device does not have MU-MIMO receive capability).

Figure 24:
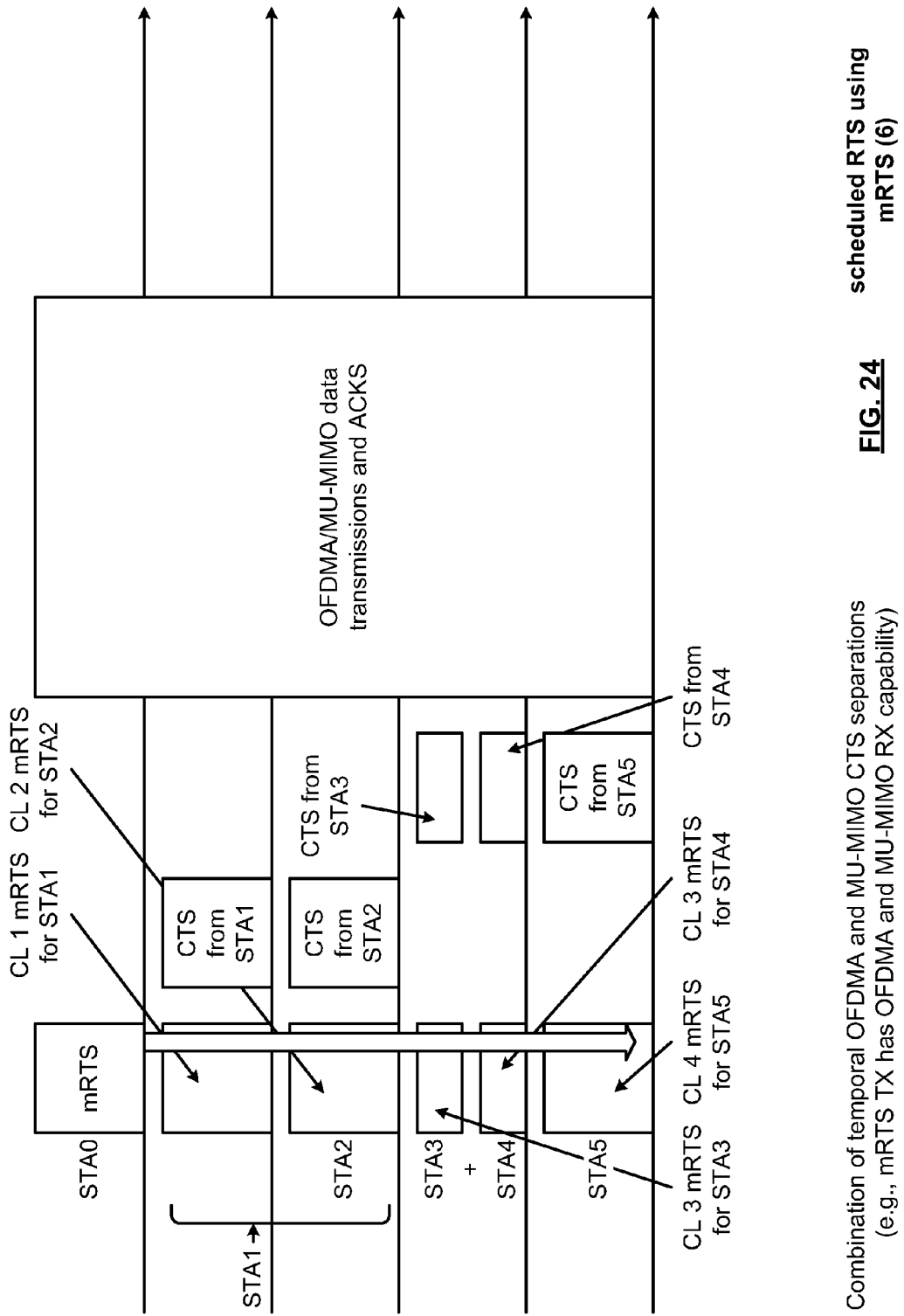

Referring to FIG. 24, this embodiment shows a combination of temporal and OFDMA and MU-MIMO CTS separations. Such operation may be employed when the mRTS transmitting wireless communication device has OFDMA and MU-MIMO receive capability.

Figure 25:
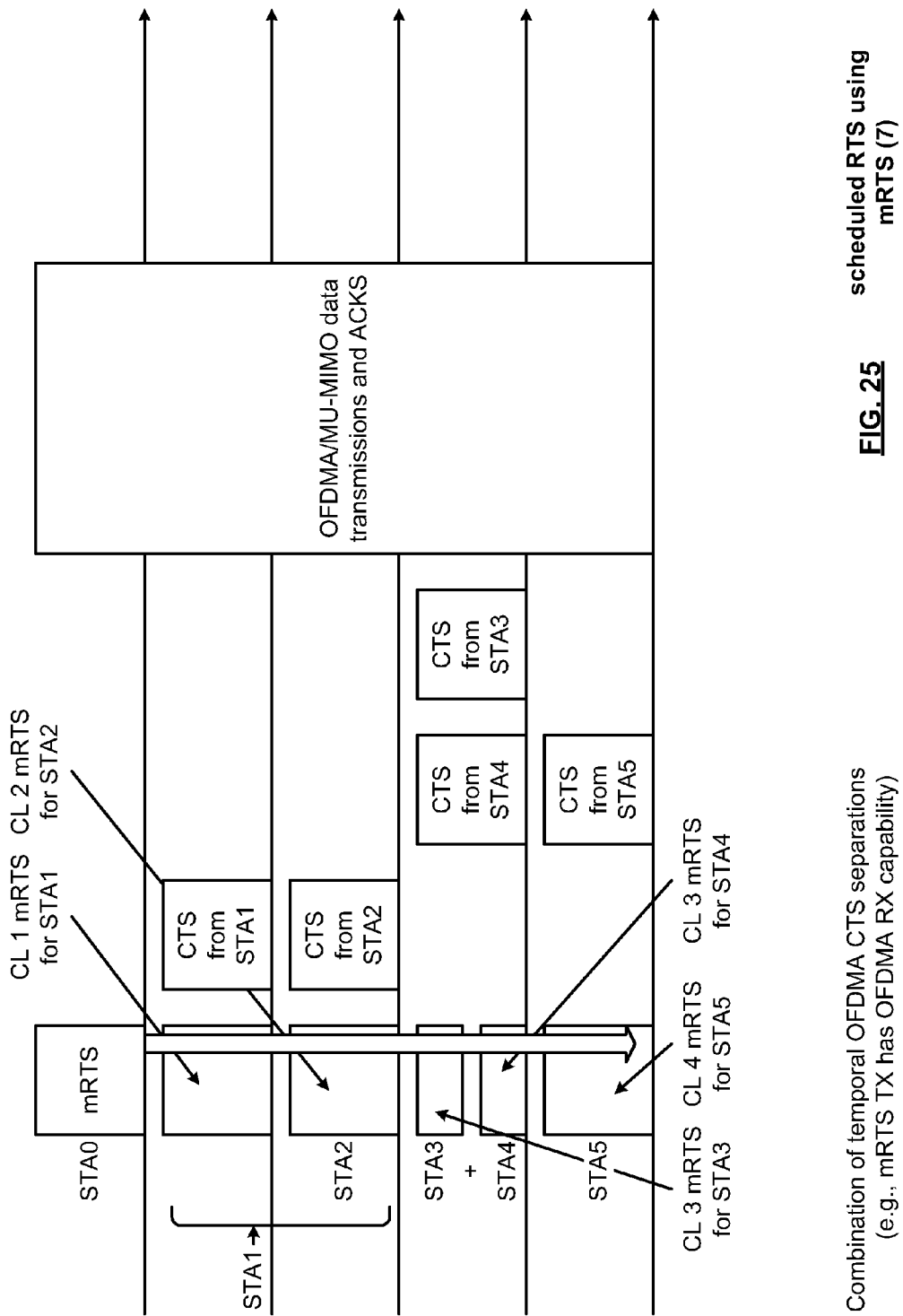

Referring to FIG. 25, this embodiment shows a combination of temporal and OFDMA CTS separations. Such operation may be employed when the mRTS transmitting wireless communication device has OFDMA receive capability.

Figure 26:
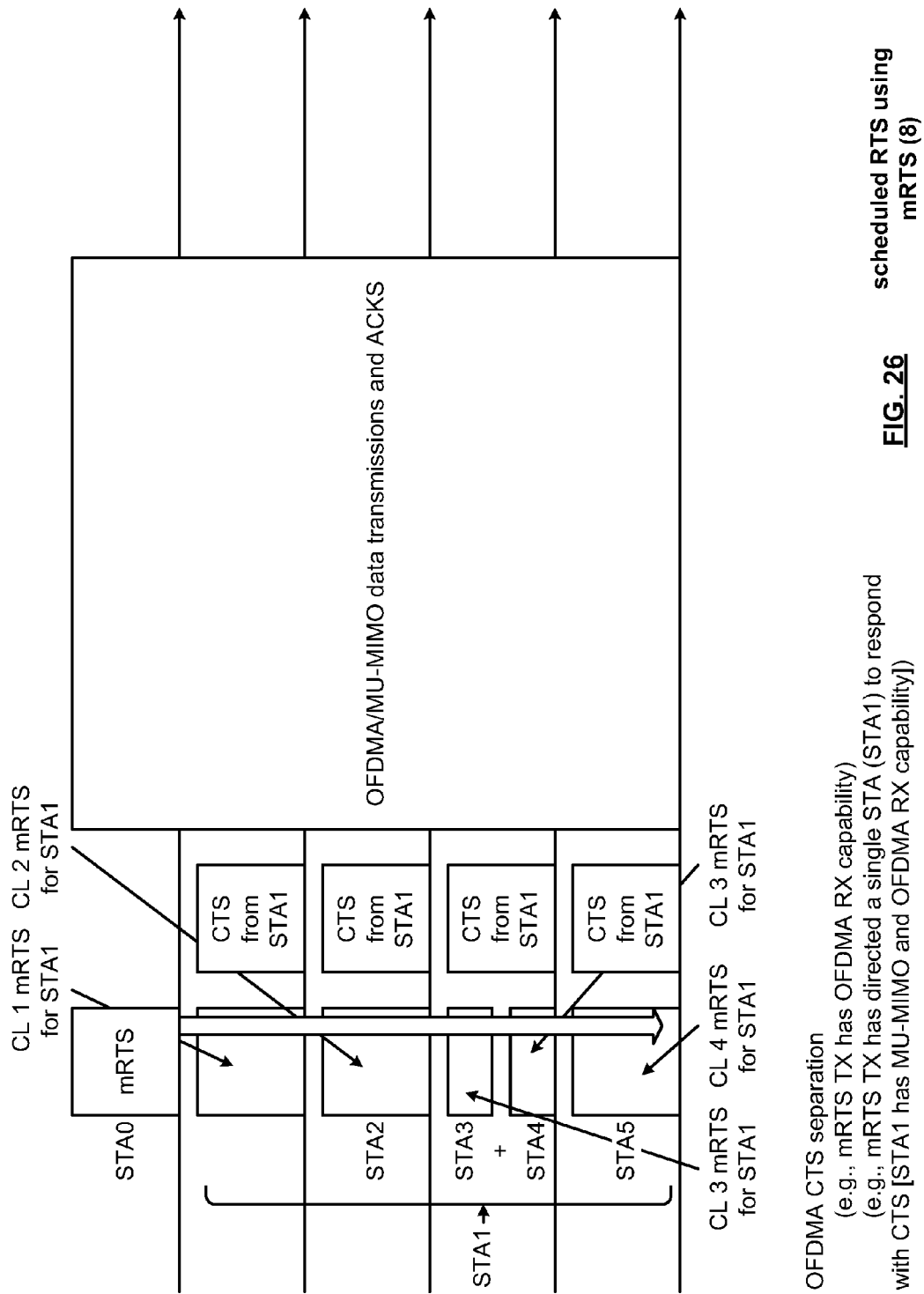

Referring to FIG. 26, this embodiment shows OFDMA CTS separation. Such operation may be employed when the mRTS transmitting wireless communication device has OFDMA receive capability, and has directed a single STA (STA1) to respond with CTS. STA1 of this embodiment has MU-MIMO and OFDMA receive capability and OFDMA transmit capability.

Figure 27:
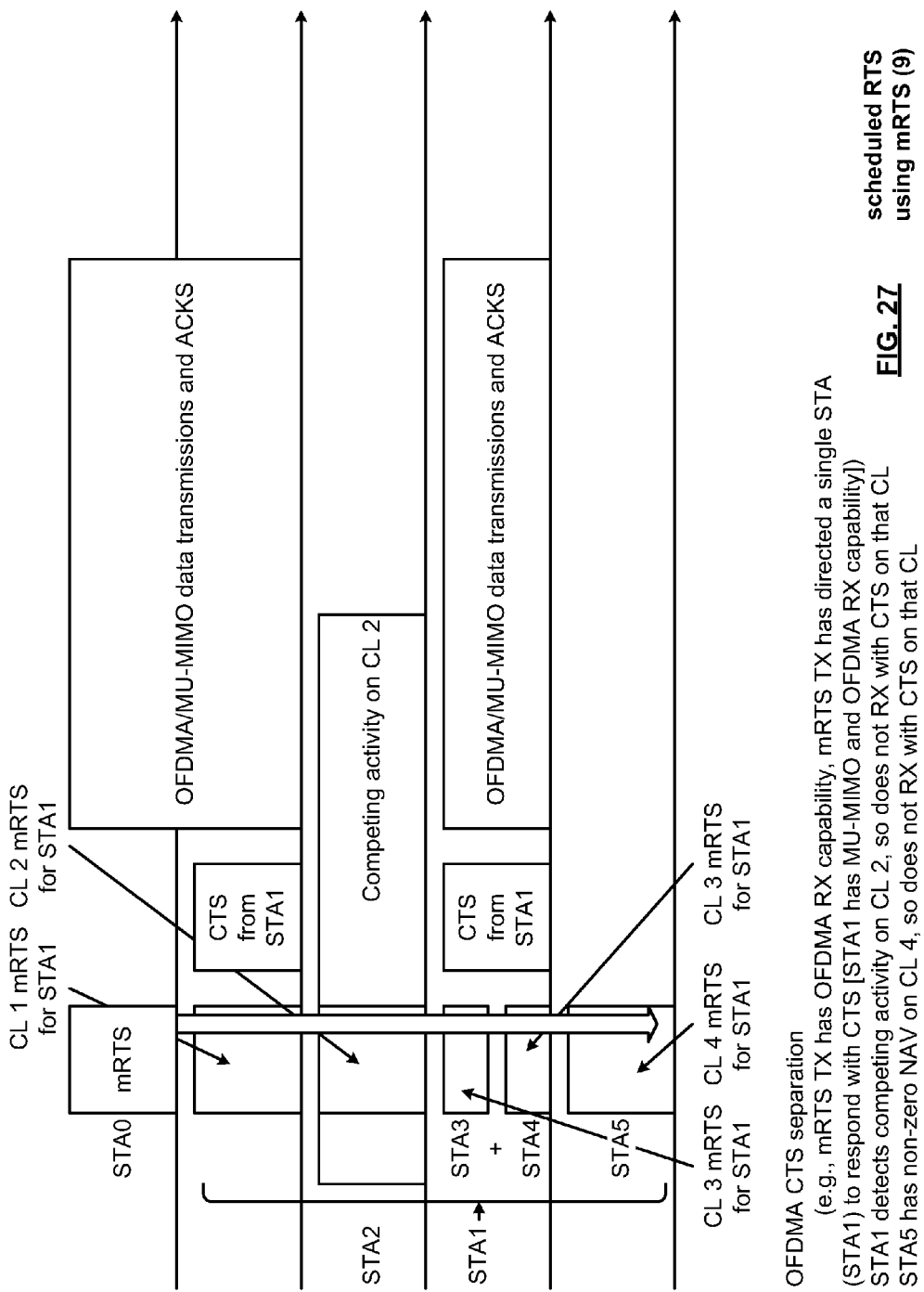

Referring to FIG. 27, this embodiment also shows OFDMA CTS separation. Again, such operation may be employed when the mRTS transmitting wireless communication device has OFDMA receive capability, and has directed a single STA (STA1) to respond with CTS. STA1 of this embodiment has MU-MIMO and OFDMA receive capability and OFDMA transmit capability.

In this embodiment, however, STA1 detects competing activity on cluster 2, so STA2 does not respond with CTS on that cluster. STA1 has a non-zero network allocation vector (NAV) on cluster 4, so STA1 also does not respond with CTS on that cluster.

Figure 28:
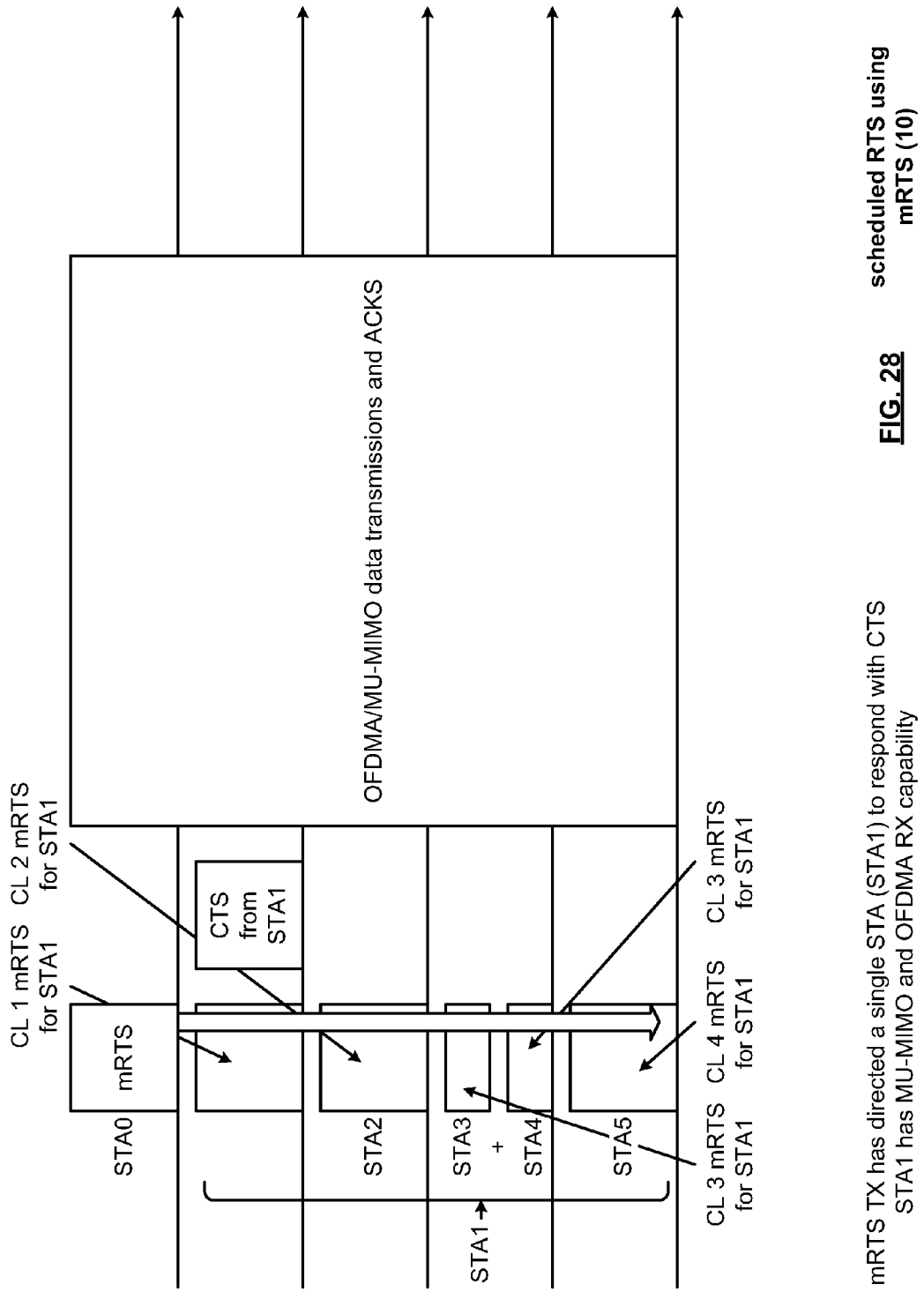

Referring to FIG. 28, this embodiment shows a situation where a transmitting wireless communication device has directed a single STA (STA1) to respond with CTS on cluster 1 alone. STA1 of this embodiment has MU-MIMO and OFDMA receive capability.

Figure 29:
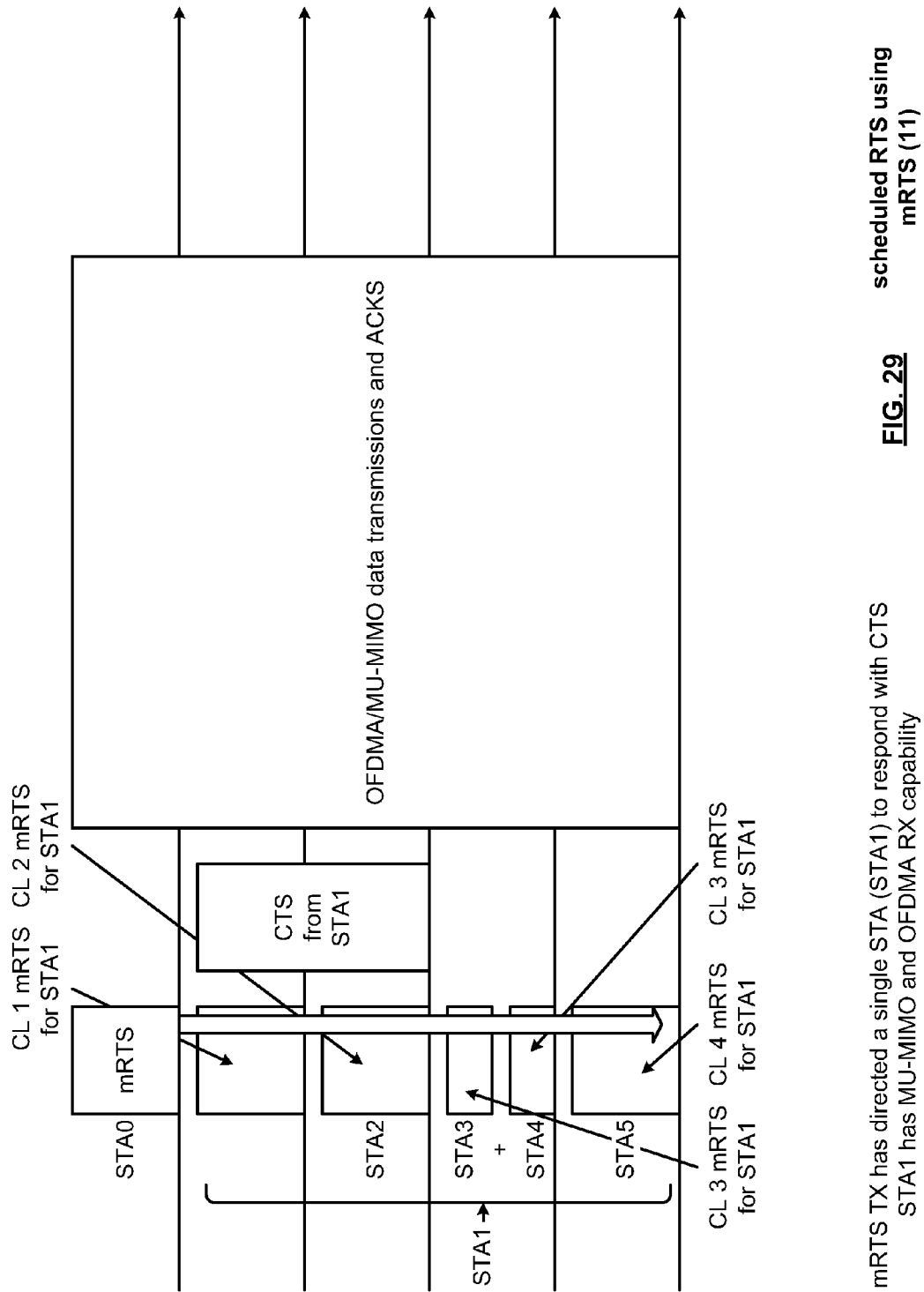

Referring to FIG. 29, this embodiment also shows a situation where a transmitting wireless communication device has directed a single STA (STA1) to respond with CTS, expect this time using both clusters 1 and 2. STA1 of this embodiment has MU-MIMO and OFDMA receive capability.

Figure 30:
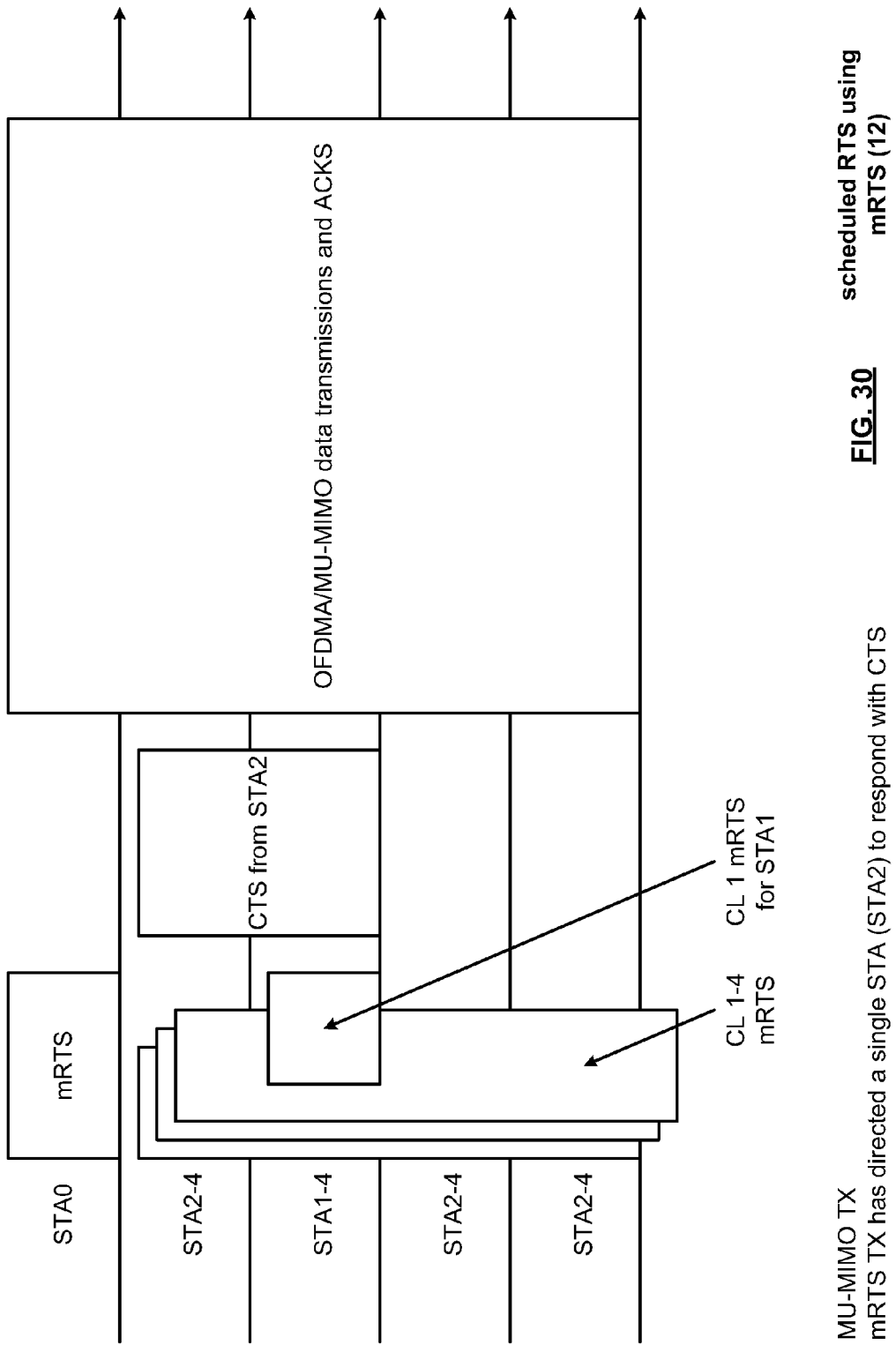

Referring to FIG. 30, this embodiment shows MU-MIMO transmission such that the mRTS transmitting wireless communication device has directed a single STA (STA2) to respond with CTS using both clusters 1 and 2. The mRTS is transmitted using MU-MIMO. In this embodiment, STA1 can only operate on cluster 2. Therefore, the RTS on STA1 is transmitted on cluster 2. The other STAs can transmit on clusters 1 to 4, therefore, the mRTS to other stations are transmitted on channel 1 to 4.

Figure 31:
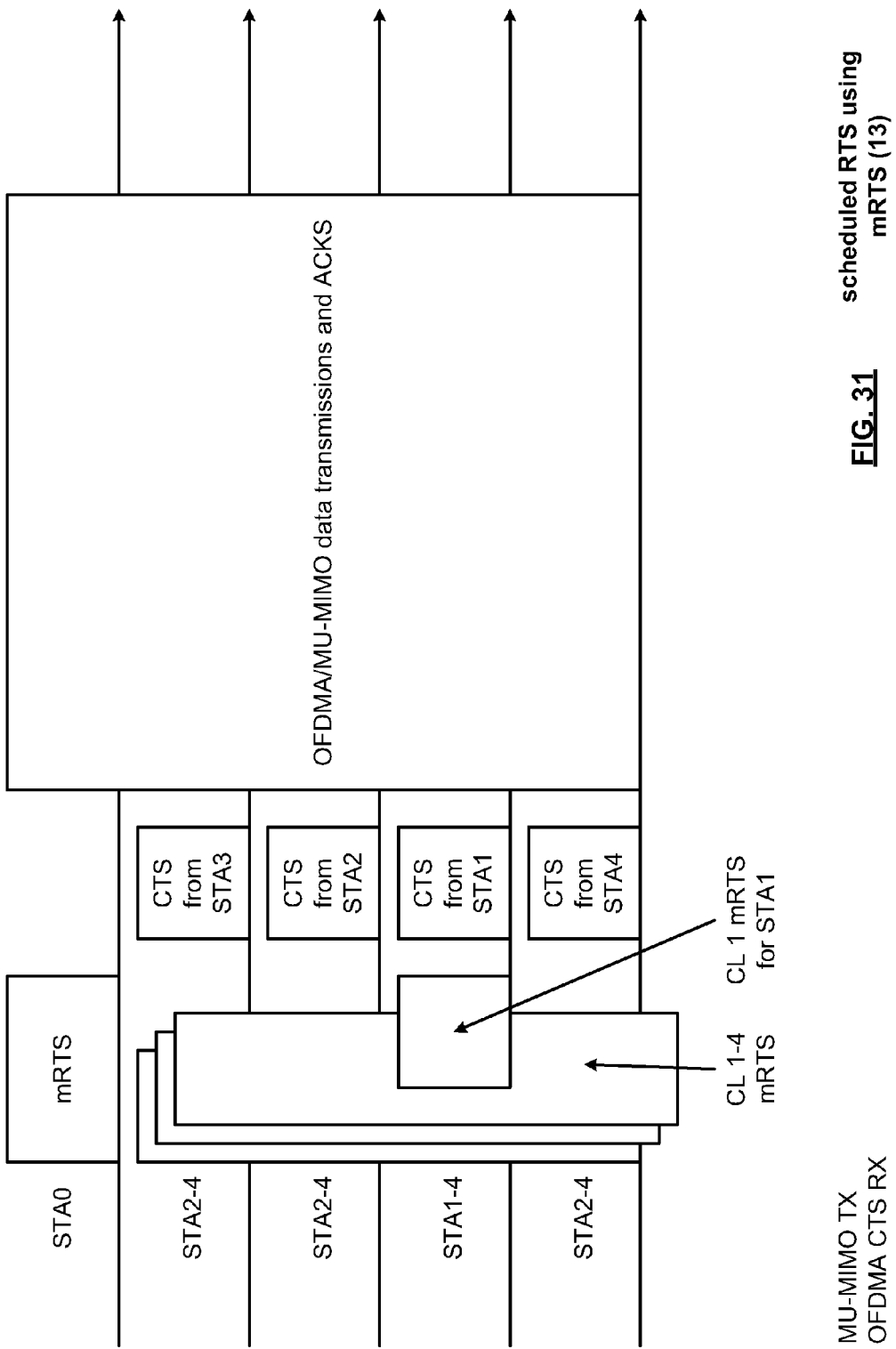

Referring to FIG. 31, this embodiment shows MU-MIMO transmission such that the transmitting wireless communication device directs the various STAs to provide their respective CTSs in accordance with OFDMA signaling. The transmitting wireless communication device has OFDMA receive capability, and as such the CTSs can be provided to the transmitting wireless communication device in accordance with OFDMA signaling.

Figure 32:
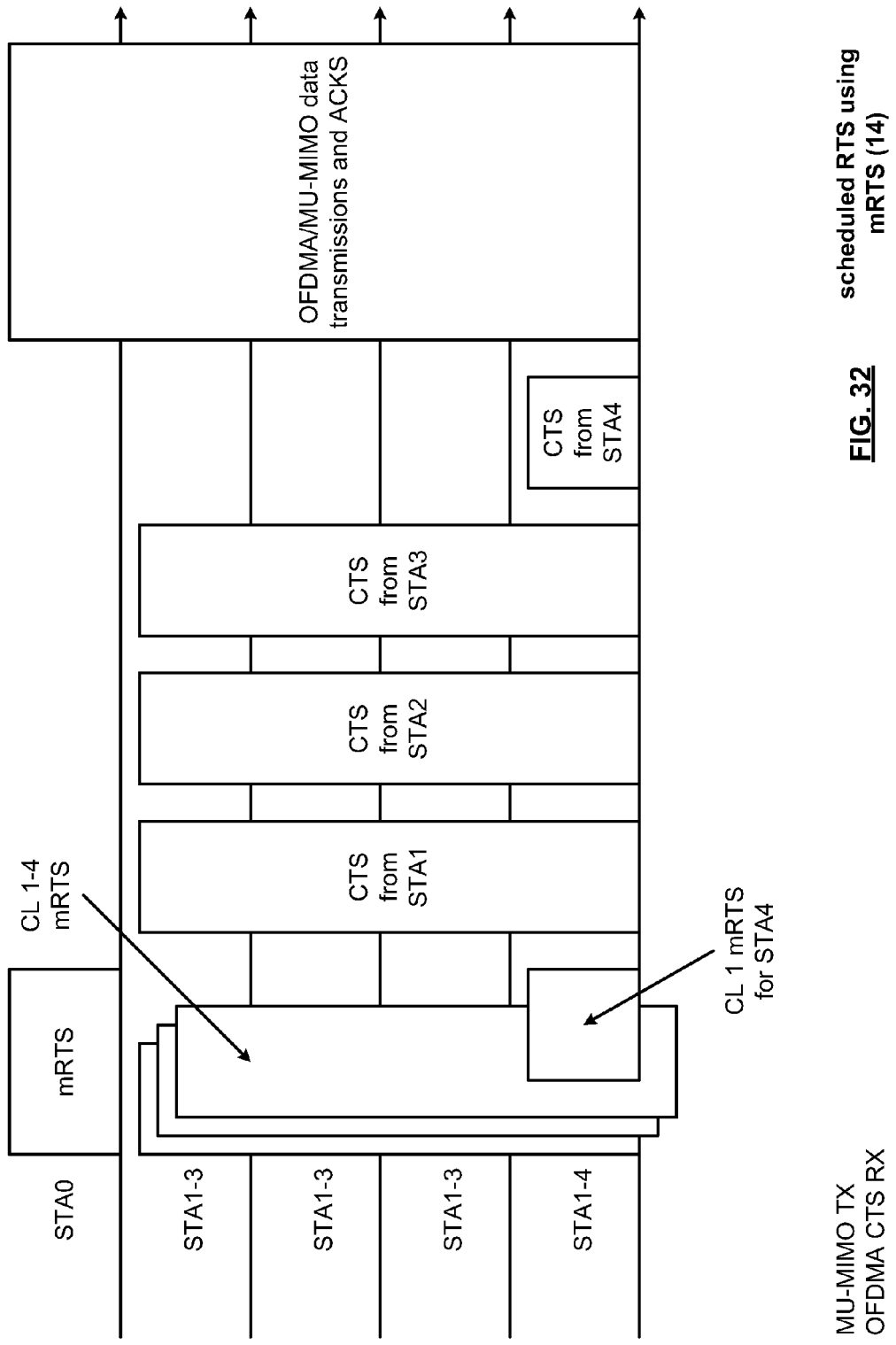

Referring to FIG. 32, this embodiment shows MU-MIMO transmission such that the transmitting wireless communication device directs the various STAs to provide their respective CTSs in accordance with OFDM signaling.

Figure 33:
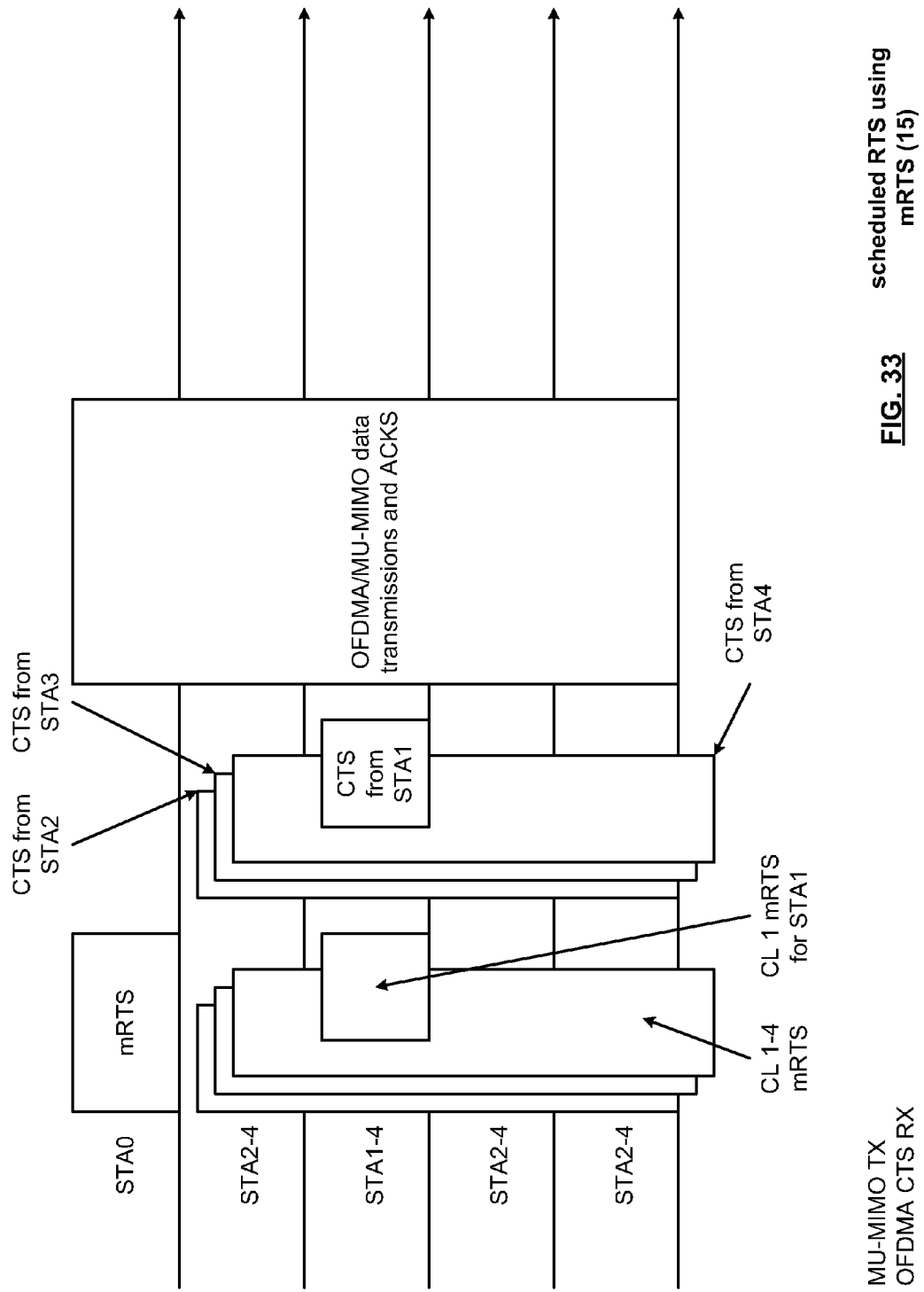

Referring to FIG. 33, this embodiment shows MU-MIMO transmission such that the transmitting wireless communication device directs the various STAs to provide their respective CTSs in accordance with MU-MIMO signaling.

It is also noted that transmission beamforming information or channel state information may also be employed in accordance with the various RTS and CTS exchange operations performed in accordance with various aspects and principles of the invention. For example, the data transmissions that follow RTS/CTS exchange may or may not have beamforming vectors applied. The intended data receivers should know whether beamforming vectors will be informed or not, and the intended receivers can get better SINR if they know of the transmission beamforming vectors (TXBFs) of other intended receivers in the same transmission.

TXBF vector signaling information, channel state information, or other embodiments of channel feedback or beamforming information may be included in an RTS, such that the information included therein is used to describe the manner by which upcoming transmissions are to be made. Such information may indicate which TXBF vectors are for which receiving wireless communication devices as targets of the MU-MIMO transmission through respective SID values in the RTS. For example, the order of the TXBF sequence may be the same as the order of the respective SID values, so that recipients can identify which TXBF vectors are for which recipients.

Such TXBF vector signaling information may also indicate to the targets which of the TXBF vectors for other STAs identified in the RTS are to use the same cluster for reception. The targets may also use such TXBF vectors for cancellation.

Alternatively, the TXBF vector signaling information may be conveyed in separate frame exchanges (e.g., in accordance with a multi-cast channel sounding frame sent from a transmitting wireless communication device and respective sounding feedback signals provided from receiving wireless communication devices).

With respect to the mRTS frame format (e.g., with respect to FIG. 14), a CTS_END value of ZERO may be used to indicate a MU-MIMO capable receiving wireless communication device that is not a CTS transmitter (e.g., that will not be sending CTSs back to the transmitting wireless communication device).

Also, such TXBF vector signaling may be chosen not to be transmitted in an RTS frame if transmitter decides so. For example, when the transmitting wireless communication device believes there is no need to have additional receiver process in order to cancel any residual interference.

FIG. 34, FIG. 35, FIG. 36, FIG. 37A, FIG. 37B, FIG. 38A, and FIG. 38B are diagrams illustrating various embodiments of methods for operating one or more wireless communication devices.

Figure 34:
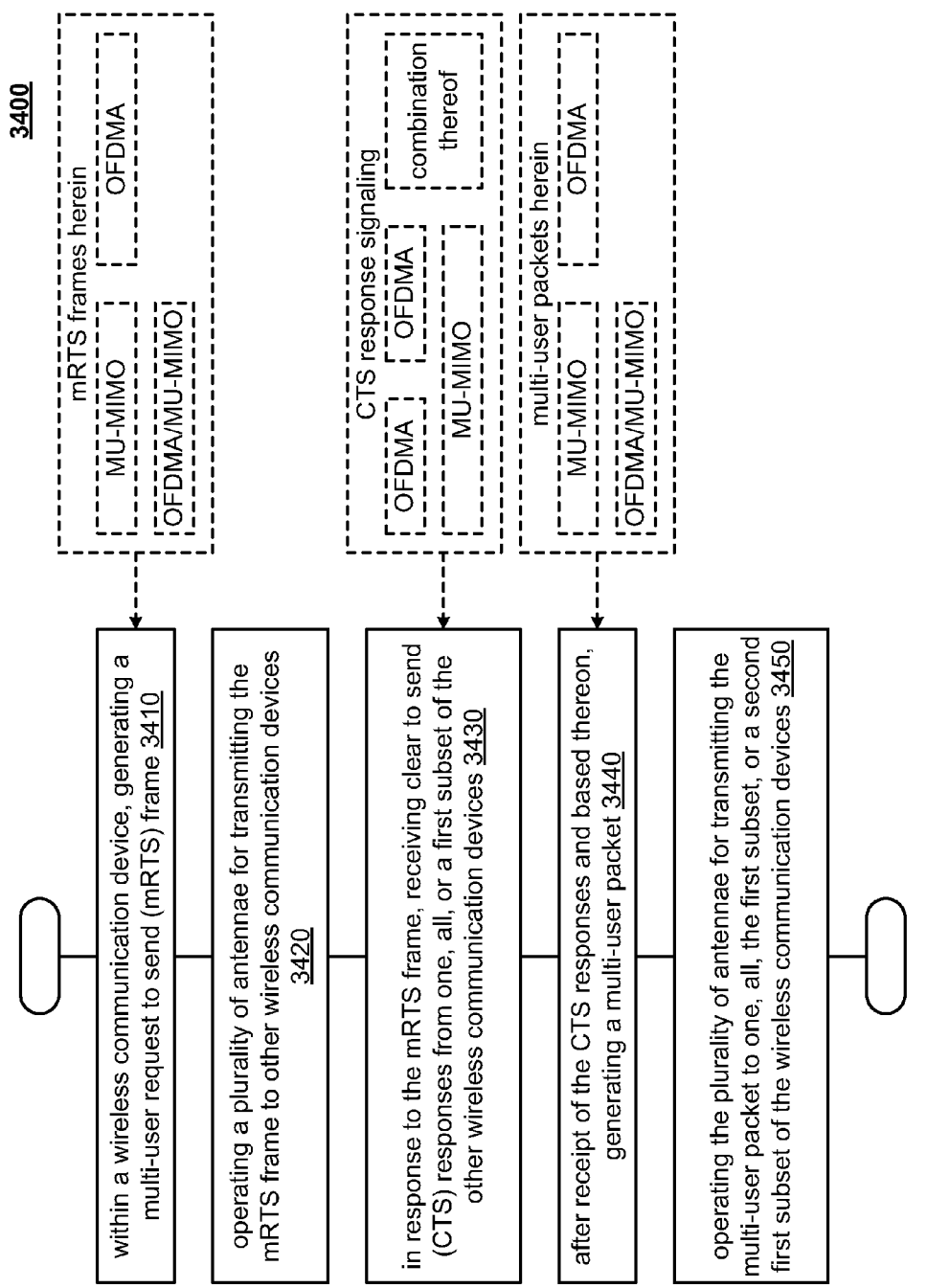

Referring to method 3400 of FIG. 34, the method 3400 begins by generating a multi-user request to send (mRTS) frame within a wireless communication device, as shown in a block 3410. The types of mRTS frames that may be employed in this embodiment and others herein may be generated in accordance with a variety of signaling types including MU-MIMO, OFDMA, and/or combinations thereof such as MU-MIMO/OFDMA.

The method 3400 continues by operating a plurality of antennae for transmitting the mRTS frame to other wireless communication devices, as shown in a block 3420.

The method 3400 then operates by receiving clear to send (CTS) responses from one, all, or a first subset of the other wireless communication devices in response to the mRTS frame, as shown in a block 3430. The CTS responses may be provided back from the wireless communication devices to the transmitting wireless communication device to in accordance with any of a variety of signaling formats including OFDM, OFDMA, MU-MIMO, and/or any combination thereof.

After the RTS and CTS exchange has been performed, the method 3400 may operate by performing any of various types of data communications (possibly also including ACK responses) between the transmitting wireless communication device and the receiving wireless communication devices. Several such embodiments of performing such data communications are also described and depicted with reference to FIG. 15-33. In this embodiment, the method 3400 continues by generating a multi-user packet after receipt of the CTS responses and based thereon, as shown in a block 3440. Various types of multi-user packets may be employed in this embodiment and others herein including MU-MIMO frames, OFDMA frames, and/or combinations thereof such as MU-MIMO/OFDMA frames.

The method 3400 continues by operating the plurality of antennae for transmitting the multi-user packet to one, all, the first subset, or a second first subset of the wireless communication devices, as shown in a block 3450.

Referring to method 3500 of FIG. 35, the method 3500 begins by generating a plurality of request to send (RTS) frames within a wireless communication device, as shown in a block 3510. In this embodiment, the respective RTS frames may correspond respectively to various receiving wireless communication devices within a multi-user communication system.

The method 3500 continues by operating a plurality of antennae for transmitting the plurality of RTS frames respectively to other wireless communication devices, as shown in a block 3520. In certain embodiments, the plurality of RTS frames may be simultaneously transmitted from the transmitting wireless communication device.

The method 3500 then operates by receiving clear to send (CTS) responses from one, all, or a first subset of the other wireless communication devices in response the plurality of RTS frames, as shown in a block 3530. The CTS responses may be provided back from the wireless communication devices to the transmitting wireless communication device to in accordance with any of a variety of signaling formats including OFDM, OFDMA, MU-MIMO, and/or any combination thereof.

After receipt of the CTS responses and based thereon, the method 3500 continues by generating a multi-user packet, as shown in a block 3540. Again, various types of multi-user packets may be employed in this embodiment and others herein including MU-MIMO frames, OFDMA frames, and/or combinations thereof such as MU-MIMO/OFDMA frames.

The method 3500 continues by operating the plurality of antennae for transmitting the multi-user packet to one, all, the first subset, or a second first subset of the wireless communication devices, as shown in a block 3550.

Referring to method 3600 of FIG. 36, within a receiving wireless communication device, the method 3600 begins by receiving a multi-user request to send (mRTS) frame from a transmitting wireless communication device, as shown in a block 3610.

Within the receiving wireless communication device, the method 3600 continues by determining if mRTS frame is intended for the receiving wireless communication device (e.g., SID), as shown in a block 3620.

If the mRTS is intended for the receiving wireless communication device, as determined by the decision block 3630, then based on at least one instruction (e.g., timing, order, cluster, etc.) within the mRTS frame, the method 3600 continues by transmitting a clear to send (CTS) to the transmitting wireless communication device, as shown in a block 3640. Alternatively, if the mRTS is not intended for the receiving wireless communication device, the method 3600 continues by discarding mRTS frame, as shown in a block 3650.

Referring to method 3700 of FIG. 37A, the method 3700 begins by operating at least one antenna for transmitting a mRTS frame to other wireless communication devices on each of a plurality of clusters, as shown in a block 3710. The method 3700 continues by receiving a first CTS from a first of the wireless communication devices via a first cluster, as shown in a block 3720.

The method 3700 then operates by receiving a second CTS from a second of the wireless communication devices via a second cluster, as shown in a block 3730. The process can continue by receiving additional CTSs from other receiving wireless communication devices, as shown by the method 3700 continuing by receiving a Nth CTS from an Nth of the wireless communication devices via an Nth cluster, as shown in a block 3790. In some embodiments, the operations of the blocks 3730 through 3790 may be performed simultaneously or in parallel with one another. For example, as shown by block 3730x, the method 3700 may operate by receiving second to Nth CTSs simultaneously/in parallel with one another. While this embodiment shows respective clusters being received on different respective clusters, it is of course noted that a same cluster may be employed by two different receiving wireless communication device for providing their respective CTSs back to a transmitting wireless communication device.

Referring to method 3701 of FIG. 37B, the method 3701 begins by operating a first antenna for transmitting a mRTS frame to a first wireless communication device on a first cluster, as shown in a block 3711. The method 3701 continues by operating a second antenna for transmitting the mRTS frame to a second wireless communication device on a second cluster, as shown in a block 3721. In some instances, the operations of the blocks 3711 and 3721 are performed simultaneously or in parallel with one another, as shown in a block 3711x. The blocks 3711 and 3721 show a common mRTS being transmitted on different antennae using different clusters, respectively.

The method 3701 then operates by receiving a first CTS from the first wireless communication device via the first or a third cluster (being different than the first cluster), as shown in a block 3731. The method 3701 continues by receiving a second CTS from the second wireless communication device via the second or a fourth cluster (being different than the second cluster), as shown in a block 3741.

Referring to method 3800 of FIG. 38A, the method 3800 begins by operating at least one antenna for transmitting a mRTS frame to a first wireless communication device on a first subset of clusters, as shown in a block 3810. The method 3800 continues by operating at least one antenna for transmitting the mRTS frame to a second wireless communication device on a second subset of clusters, as shown in a block 3820.

The method 3800 then operates by receiving a first CTS from the first wireless communication device via the first subset of clusters or a third subset of clusters (being different than the first subset of cluster), as shown in a block 3830. The method 3800 continues by receiving a second CTS from the second wireless communication device via the second subset of clusters or a fourth subset of clusters (being different than the second subset of cluster), as shown in a block 3840.

Referring to method 3801 of FIG. 38B, the method 3801 begins by operating at least one antenna for transmitting a mRTS frame to a first wireless communication device on each of a plurality of clusters, as shown in a block 3811. The method 3801 continues by operating at least one antenna for transmitting the mRTS frame to a second wireless communication device on a second of the plurality of clusters, as shown in a block 3821.

The method 3801 then operates by operating at least one antenna for transmitting the mRTS frame to a third wireless communication device on a third of the plurality of clusters, as shown in a block 3831. The method 3801 continues by operating at least one antenna for transmitting the mRTS frame to a fourth wireless communication device on the third of the plurality of clusters, as shown in a block 3841. In others words, a common cluster is employed for transmitting the mRTS frame to each of the third and fourth wireless communication devices.

The method 3801 continues by receiving a CTS from one of the wireless communication devices via at least one of second and the third clusters, as shown in a block 3851. For example, the mRTS may include instructions therein to direct only one of the receiving wireless communication devices to provide CTS.

It is noted that, while various and multiple embodiments of methods for performing operations in accordance with various aspects of the invention have been presented for effectuating RTS and CTS exchanges these specific examples and embodiments are not exhaustive, and the principles described herein may be adapted to accommodate any desired configuration and manner of performing RTS and CTS exchange in accordance with a number of selectable principles (e.g., order, sequence, timing, cluster, signaling format, antenna configuration, etc.).

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| | | | 2.4 GHz, 20/22 MHz channel BW, 54 Mbps max bit rate | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask | 1 |
|---|---|
| Frequency Offset | dBr |
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |

TABLE 7-continued

Channelization for Table 6

| Channel | Frequency (MHz) |
|---|---|
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |

TABLE 9-continued channelization for Table 8

| Channel | Frequency (MHz) | Country | Channel | Frequency (MHz) | Country |
|---|---|---|---|---|---|
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask | 2 |
|---|---|
| Frequency Offset | dBr |
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus, comprising:
a baseband processing module for generating a multi-user request to send (mRTS) frame, wherein the mRTS frame includes a plurality of clear to send (CTS) response instructions corresponding respectively to each of a plurality of wireless communication devices and further includes cluster information for a plurality of clusters for use, respectively, by the plurality of wireless communication devices, wherein each cluster of the plurality of clusters is based upon a tone mapping of at least one channel, the at least one channel being situated with a band of a plurality of bands; and
a plurality of antennae:
transmitting the mRTS frame to the plurality of wireless communication devices; and
in response to the mRTS frame, receiving a plurality of CTS responses, based on a respective scheduling of each of the plurality of CTS response instructions, from the plurality of wireless communication devices or from a subset of the plurality of wireless communication devices to provide an airtime reservation with the each of the plurality of wireless communication devices or the subset thereof.

2. The apparatus of claim 1, wherein:
the mRTS frame being a multi-user multiple input multiple output (MU-MIMO) frame or an orthogonal frequency division multiple access (OFDMA) frame.

3. The apparatus of claim 1, wherein:
the mRTS frame being an orthogonal frequency division multiple access/multi-user multiple input multiple output (OFDMA/MU-MIMO) frame including a plurality of request to send (RTS) frames.

4. The apparatus of claim 1, wherein:
the plurality of CTS responses being received from the plurality of wireless communication devices in accordance with at least one of orthogonal frequency division multiplexing (OFDM) signaling, orthogonal frequency division multiple access (OFDMA) signaling, and multi-user multiple input multiple output (MU-MIMO) signaling.

5. The apparatus of claim 1, wherein:
the plurality of wireless communication devices including at least one multiple input multiple output (MU-MIMO) wireless communication device and at least one orthogonal frequency division multiple access (OFDMA) wireless communication device.

6. The apparatus of claim 1, wherein:
after the apparatus receiving the plurality of CTS responses and based thereon, the baseband processing module generating at least one of a multi-user multiple input multiple output (MU-MIMO) frame and an orthogonal frequency division multiple access (OFDMA) frame; and
the plurality of antennae transmitting the at least one of the MU-MIMO frame and the OFDMA frame to the plurality of wireless communication devices, to the subset of the plurality of wireless communication devices, or to at least one additional subset of the plurality of wireless communication devices.

7. The apparatus of claim 6, wherein:
the apparatus applying a plurality of beamforming vectors to the at least one of the MU-MIMO frame and the OFDMA frame.

8. The apparatus of claim 1, wherein:
the mRTS frame including beamforming vector signaling information corresponding to at least one of the plurality of wireless communication devices.

9. The apparatus of claim 1, wherein:
the cluster information directing a first of the plurality of wireless communication devices for providing a first of the plurality of CTS responses via a first of the plurality of clusters; and
the cluster information directing a second of the plurality of wireless communication devices for providing a second of the plurality of CTS responses via a second of the plurality of clusters.

10. The apparatus of claim 1, wherein:
a first of the plurality of clusters being composed of the at least one channel within a first band of the plurality of bands; and
a second of the plurality of clusters being composed of the at least one channel within a second band of the plurality of bands.

11. The apparatus of claim 1, wherein:
the apparatus simultaneously receiving at least two of the plurality of CTS responses.

12. The apparatus of claim 1, wherein:
the apparatus firstly receiving one of the plurality of CTS responses; and
the apparatus secondly receiving all remaining other of the plurality of CTS responses.

13. The apparatus of claim 1, wherein:
the baseband processing module generating a plurality of request to send (RTS) frames;
the plurality of antennae:
simultaneously transmitting the plurality of RTS frames respectively to the plurality of wireless communication devices such that each of the plurality of RTS frames corresponding respectively to one of the plurality of wireless communication devices; and
receiving at least one additional plurality of CTS responses from the plurality of wireless communication devices, from the subset of the plurality of wireless communication devices, or from at least one additional subset of the plurality of wireless communication devices; and
each of the plurality of RTS frames including a respective one of the plurality of CTS response instructions corresponding respectively to one of the plurality of wireless communication devices.

14. The apparatus of claim 1, wherein:
the apparatus being an access point (AP); and
the plurality of wireless communication devices being a plurality of wireless stations (STAs).

15. An apparatus, comprising:
a baseband processing module for generating a multi-user request to send (mRTS) frame, wherein the mRTS frame includes a plurality of clear to send (CTS) response instructions corresponding respectively to each of the plurality of wireless communication devices and further includes cluster information for a plurality of clusters for use, respectively, by the plurality of wireless communication devices, wherein each cluster of the plurality of clusters is based upon a tone mapping of at least one channel being situated with a band of a plurality of bands; and
a plurality of antennae:
transmitting the mRTS frame to a plurality of wireless communication devices; and in response to the mRTS, receiving a plurality of CTS responses, based on a respective scheduling of each of the plurality of CTS response instructions, from the plurality of wireless communication devices or from a first subset of the plurality of wireless communication devices to provide an airtime reservation with the each of the plurality of wireless communication devices or the first subset thereof; and wherein:

after the apparatus receiving the plurality of CTS responses and based thereon, the baseband processing module generating at least one of a multi-user multiple input multiple output (MU-MIMO) frame and an orthogonal frequency division multiple access (OFDMA) frame;

the plurality of antennae transmitting the at least one of the MU-MIMO frame and the OFDMA frame to the plurality of wireless communication devices, to the first subset of the plurality of wireless communication devices, or to a second subset of the plurality of wireless communication devices via the airtime reservation; and the plurality of CTS response instructions including the cluster information indicating the plurality of clusters for use, respectively, by the plurality of wireless communication devices for providing the plurality of CTS responses.

16. The apparatus of claim 15, wherein:
the mRTS frame being a multi-user multiple input multiple output (MU-MIMO) frame or an orthogonal frequency division multiple access (OFDMA) frame.

17. The apparatus of claim 15, wherein:
the mRTS frame being an orthogonal frequency division multiple access/multi-user multiple input multiple output (OFDMA/MU-MIMO) frame including a plurality of request to send (RTS) frames.

18. The apparatus of claim 15, wherein:
the plurality of CTS responses being received from the plurality of wireless communication devices in accordance with at least one of orthogonal frequency division multiplexing (OFDM) signaling, orthogonal frequency division multiple access (OFDMA) signaling, and multi-user multiple input multiple output (MU-MIMO) signaling.

19. The apparatus of claim 15, wherein:
a first of the plurality of clusters being composed of the at least one channel within a first band of the plurality of bands; and
a second of the plurality of clusters being composed of the at least one channel within a second band of the plurality of bands.

20. The apparatus of claim 15, wherein:
a first of the plurality of clusters being composed of a first plurality of channels among a first band and a second band of the plurality of bands; and
a second of the plurality of clusters being composed of a second plurality of channels among a third band and a fourth band of the plurality of bands.

21. The apparatus of claim 15, wherein:
the apparatus being an access point (AP); and
the plurality of wireless communication devices being a plurality of wireless stations (STAs).

22. A method for operating a wireless communication device, the method comprising:
generating a multi-user request to send (mRTS) frame, wherein the mRTS frame including a plurality of clear to send (CTS) response instructions corresponding respectively to each of a plurality of wireless communication devices and further including cluster information for a plurality of clusters for use, respectively, by the plurality of wireless communication devices, wherein each cluster of the plurality of clusters is based upon a tone mapping of at least one channel being situated with a band of a plurality of bands;

operating a plurality of antennae for transmitting the mRTS frame to the plurality of wireless communication devices; and in response to the mRTS frame, receiving a plurality of CTS responses, based on a respective scheduling of each of the plurality of CTS response instructions, from the plurality of wireless communication devices or from a subset of the plurality of wireless communication devices to provide an airtime reservation with each of the plurality of wireless communication devices or the subset thereof.

23. The method of claim 22, wherein:
the mRTS frame being a multi-user multiple input multiple output (MU-MIMO) frame or an orthogonal frequency division multiple access (OFDMA) frame.

24. The method of claim 22, wherein:
the mRTS frame being an orthogonal frequency division multiple access/multi-user multiple input multiple output (OFDMA/MU-MIMO) frame including a plurality of request to send (RTS) frames.

25. The method of claim 22, further comprising:
receiving the plurality of CTS responses from the plurality of wireless communication devices in accordance with at least one of orthogonal frequency division multiplexing (OFDM) signaling, orthogonal frequency division multiple access (OFDMA) signaling, and multi-user multiple input multiple output (MU-MIMO) signaling.

26. The method of claim 22, further comprising:
after receiving the plurality of CTS responses and based thereon, generating at least one of a multi-user multiple input multiple output (MU-MIMO) frame and an orthogonal frequency division multiple access (OFDMA) frame; and operating the plurality of antennae transmitting the at least one of the MU-MIMO frame and the OFDMA frame to the plurality of wireless communication devices, to the subset of the plurality of wireless communication devices, or to at least one additional subset of the plurality of wireless communication devices.

27. The method of claim 22, wherein:
the cluster information directing a first of the plurality of wireless communication devices for providing a first of the plurality of CTS responses via a first of the plurality of clusters; and
the cluster information directing a second of the plurality of wireless communication devices for providing a second of the plurality of CTS responses via a second of the plurality of clusters.

28. The method of claim 22, wherein:
a first of the plurality of clusters being composed of the at least one channel within a first band of the plurality of bands; and
a second of the plurality of clusters being composed of the at least one channel within a second band of the plurality of bands.

29. The method of claim 22, wherein:
the wireless communication device being an access point (AP); and
the plurality of wireless communication devices being a plurality of wireless stations (STAs).

* * * * *